US009507135B2

(12) United States Patent
Iketaki

(10) Patent No.: US 9,507,135 B2
(45) Date of Patent: Nov. 29, 2016

(54) SUPER-RESOLUTION MICROSCOPE AND MODULATION OPTICAL ELEMENT

(71) Applicant: OLYMPUS CORPORATION, Tokyo (JP)

(72) Inventor: Yoshinori Iketaki, Tokyo (JP)

(73) Assignee: Olympus Corporation, Tokyo (JP)

( * ) Notice: Subject to any disclaimer, the term of this patent is extended or adjusted under 35 U.S.C. 154(b) by 94 days.

(21) Appl. No.: 14/452,369

(22) Filed: Aug. 5, 2014

(65) Prior Publication Data
US 2015/0034810 A1 Feb. 5, 2015

(30) Foreign Application Priority Data

Aug. 5, 2013 (JP) .................. 2013-162695

(51) Int. Cl.
G02B 21/00 (2006.01)
(52) U.S. Cl.
CPC ....... G02B 21/0032 (2013.01); G02B 21/0068 (2013.01); G02B 21/0076 (2013.01)
(58) Field of Classification Search
CPC .......... G02B 21/0032; G02B 21/0068; G02B 21/0076
USPC ................ 250/225, 458.1; 359/388
See application file for complete search history.

(56) References Cited

U.S. PATENT DOCUMENTS

| 2004/0227101 A1* | 11/2004 | Iketaki | G02B 26/08 250/458.1 |
| 2011/0140000 A1* | 6/2011 | Iketaki | G02B 21/0068 250/458.1 |
| 2011/0310475 A1* | 12/2011 | Iketaki | G01N 21/6458 359/388 |
| 2012/0194824 A1* | 8/2012 | de Groot | G01B 9/02003 356/482 |

FOREIGN PATENT DOCUMENTS

| JP | H8-184552 A | 7/1996 |
| JP | 2001-100102 A | 4/2001 |
| JP | 2010-15026 A | 1/2010 |

* cited by examiner

Primary Examiner — Renee Chavez
(74) Attorney, Agent, or Firm — Andrews Kurth Kenyon LLP

(57) ABSTRACT

A super-resolution microscope includes a modulation optical element (10) that is disposed in an illumination optical system along a light path traveled by first illumination light and second illumination light and spatially modulates the second illumination light. In the modulation optical element (10), a plurality of optical substrates exhibiting anisotropy in a refractive index distribution are joined in a coplanar manner, and at least two of the optical substrates have a different refractive index with respect to a polarization direction of the second illumination light.

18 Claims, 27 Drawing Sheets

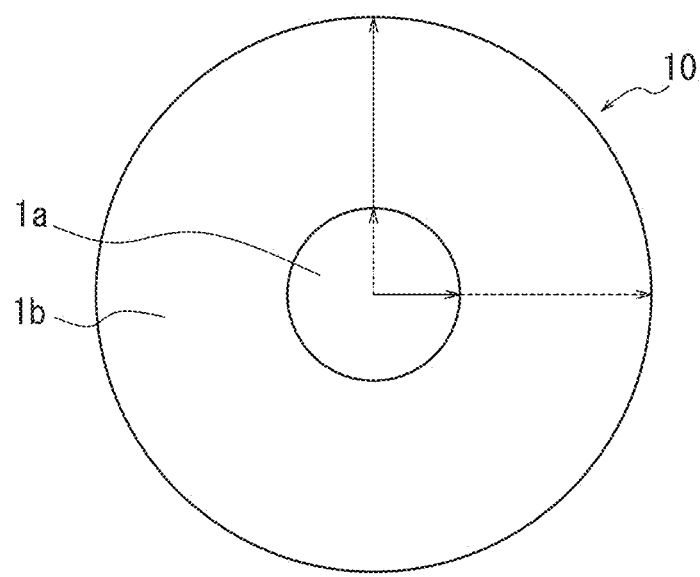

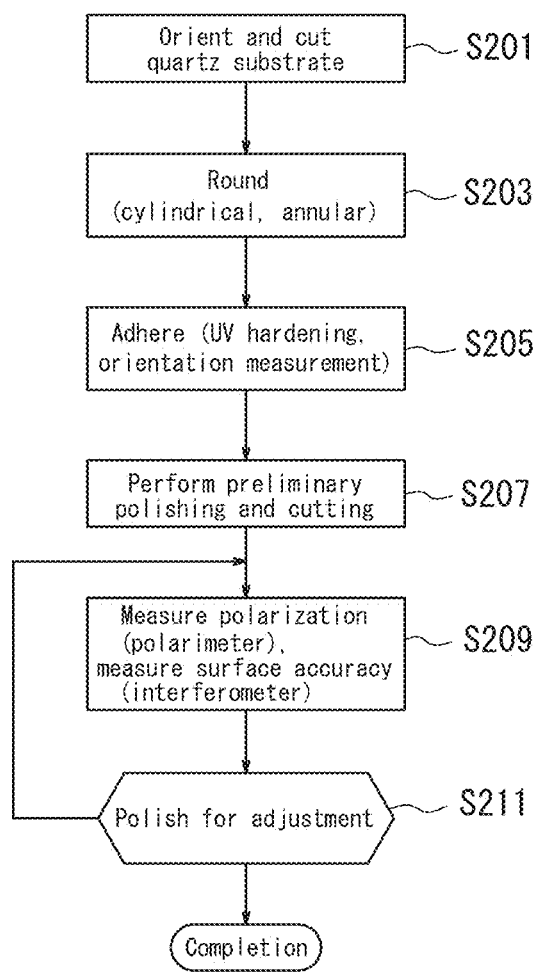

⎯⎯⎯⎯→ Phase advancing axis
⎯⎯⎯⎯→ Phase delaying axis

Pumping light

Erasing light

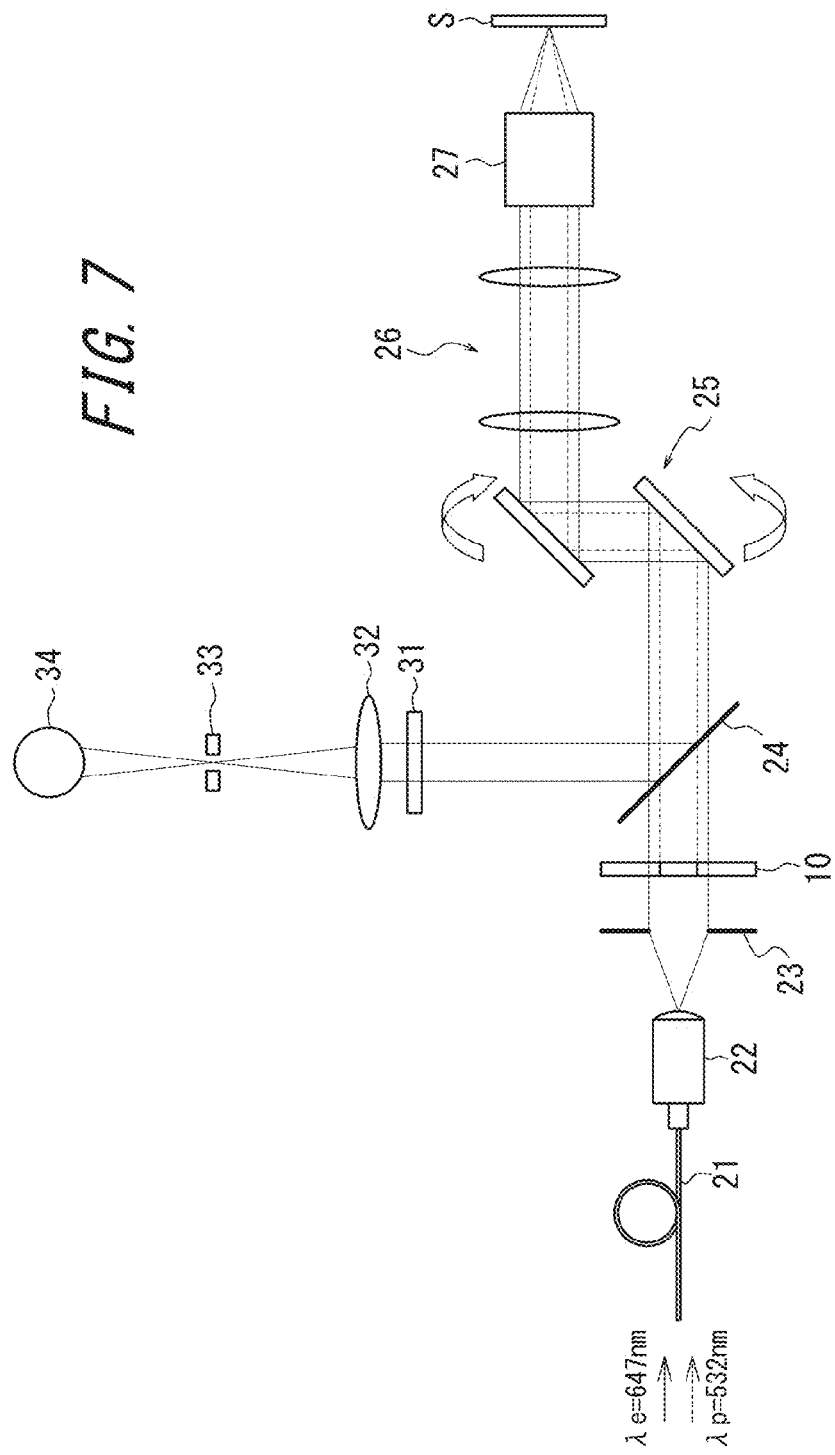

FIG. 16A
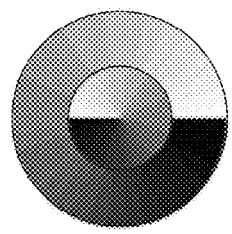
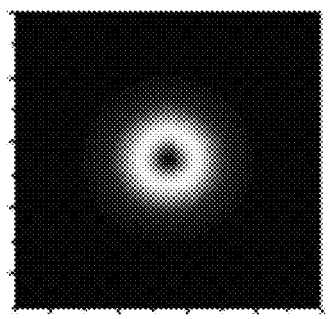
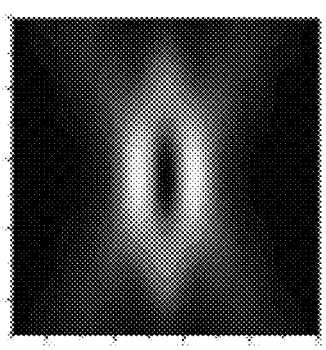
FIG. 16B
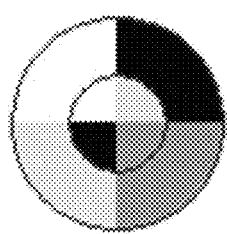
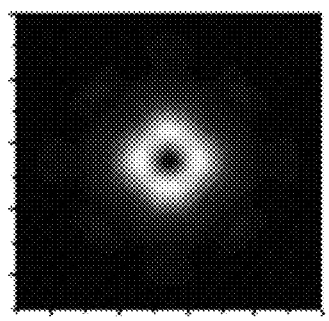
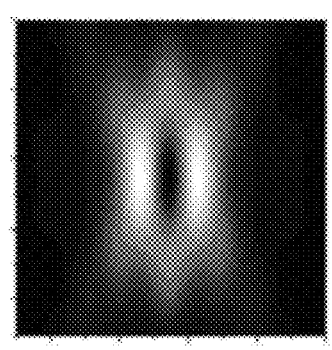

→ Phase advancing axis
----→ Phase delaying axis

SUPER-RESOLUTION MICROSCOPE AND MODULATION OPTICAL ELEMENT

CROSS-REFERENCE TO RELATED APPLICATION

This application claims priority to and the benefit of Japanese Patent Application No. 2013-162695 filed Aug. 5, 2013, the entire contents of which are incorporated herein by reference.

TECHNICAL FIELD

The present invention relates to a super-resolution microscope and to a modulation optical element that can be used therein.

BACKGROUND ART

The art of optical microscopes is well-established, and a variety of types of microscopes have been developed. In recent years, with progress in peripheral technology starting with laser technology and electronic imaging technology, even more sophisticated microscope systems have been developed.

Against this background, a sophisticated microscope has been proposed that can not only control contrast in the resulting image but that also allows for chemical analysis by illuminating a sample with multiple wavelengths of light to induce a double resonance absorption process (for example, see Patent Literature 1).

This microscope allows for observation of absorption and fluorescence caused by a specific optical transition by selecting a specific molecule using the double resonance absorption. This principle is described with reference to FIGS. 22 to 25. FIG. 22 illustrates an electronic structure of a valence electron orbital of a molecule composing a sample. First, an electron in the valence electron orbital of the molecule at a ground state (S0 state: stable state) illustrated in FIG. 22 is excited by light of a wavelength $\lambda_1$, and the molecule transitions to a first excited state (S1 state) illustrated in FIG. 23. Next, an electron is similarly excited by light of a different wavelength $\lambda_2$ and the molecule transitions to a second excited state (S2 state) illustrated in FIG. 24. In this excited state, the molecule emits fluorescence or phosphorescence and returns to the ground state as illustrated in FIG. 25.

Microscopy adopting the double resonance absorption process is for observing absorption images and emission images by using the absorption process in FIG. 24 and the emission of light, such as fluorescence and phosphorescence, in FIG. 25. According to this microscopy, first, the molecule composing the sample is excited to the S1 state by laser light or the like of a resonant wavelength $\lambda_1$, as illustrated in FIG. 23. At this time, the number of molecules in the S1 state in a unit volume increases as the intensity of emitted light increases.

Here, a linear absorption coefficient is obtained by multiplying an absorption cross-section per molecule by the number of molecules per unit volume. Therefore, in an excitation process as illustrated in FIG. 24, the linear absorption coefficient with respect to the subsequently emitted light of resonant wavelength $\lambda_2$ depends on the intensity of the initially emitted light of resonant wavelength $\lambda_1$. That is, the linear absorption coefficient with respect to wavelength $\lambda_2$ can be controlled by the intensity of the light of wavelength $\lambda_1$. This indicates that, by illuminating the sample with light of two wavelengths, i.e. wavelength $\lambda_1$ and wavelength $\lambda_2$, and taking a transmission image with wavelength $\lambda_2$, the contrast of the transmission image can be controlled completely by light of wavelength $\lambda_1$.

Furthermore, if a deexcitation process from the excited state in FIG. 24 to the ground state in FIG. 25 can occur with fluorescence or phosphorescence, the emission intensity thereof is proportional to the number of molecules in the S1 state. Accordingly, it is also possible to control the image contrast when using the microscope as a fluorescence microscope.

Moreover, microscopy adopting the double resonance absorption process allows not only for control of image contrast as described above but also for chemical analysis. That is, since the orbital of the outermost electron in FIG. 22 has an energy level specific to each molecule, wavelength $\lambda_1$ varies among molecules. Simultaneously, wavelength $\lambda_2$ is also specific to each molecule.

Even if the sample is irradiated by conventional light of a single wavelength, an absorption image or a fluorescent image of particular molecules can be observed to some degree. Generally, however, since wavelength ranges of absorption bands of several molecules overlap one another, it is not possible to precisely identify a chemical composition of a sample when the sample is irradiated by light of a single wavelength.

By contrast, microscopy adopting the double resonance absorption process uses two wavelengths, $\lambda_1$ and $\lambda_2$, to narrow down molecules that absorb or to emit light, thus allowing for more precise identification of the chemical composition of the sample than with conventional methods. In addition, in excitation of the valence electron, only light with a particular electric field vector relative to the molecular axis is intensely absorbed. Hence, taking an absorption image or fluorescence image by determining the polarization direction of the light of wavelength $\lambda_1$ and wavelength $\lambda_2$ allows for identification of the orientation direction even for the same molecules.

Recently, a fluorescence microscope that is capable of high spatial resolution exceeding a diffraction limit by adopting the double resonance absorption process has been proposed (for example, see Patent Literature 2).

FIG. 26 illustrates a conceptual diagram of the double resonance absorption process of a molecule. In FIG. 26, the molecule at the ground state S0 is excited by the light of wavelength $\lambda_1$ to the first excited state S1 and further excited by light of wavelength $\lambda_2$ to the second excited state S2. Note that FIG. 26 shows that fluorescence from a certain type of molecule in the S2 state is extremely weak.

A molecule with an optical property as shown in FIG. 26 presents a very interesting phenomenon. Like FIG. 26, FIG. 27 is also a conceptual diagram of the double resonance absorption process which shows the vertical axis X representing an expansion of a spatial distance, a spatial area A1 irradiated by light of wavelength $\lambda_2$, and a spatial area A0 not irradiated by light of wavelength $\lambda_2$.

In FIG. 27, numerous molecules in the S1 state are generated by excitation with light of wavelength $\lambda_2$, in the spatial area A0, and at that time, fluorescence from the spatial area A0 emitted by light of wavelength $\lambda_3$ may be observed. Since the spatial area A1 is irradiated by light of wavelength $\lambda_2$, however, most of the molecules in the first excited state S1 are immediately excited to a higher state, the second excited state S2, leaving no molecules in the first excited state S1. This phenomenon has been identified for some molecules. Because of this phenomenon, since fluorescence of wavelength $\lambda_3$ is completely eliminated in the spatial area A1, and since there is no fluorescence from the second excited state S2 to begin with, all fluorescence is completely suppressed (fluorescence suppression effect) in the spatial area A1, with fluorescence only being emitted from the spatial area A0.

Furthermore, when light of wavelength $\lambda_2$ overlaps a fluorescence emission band, the molecule is forced to transition from the first excited state S1 to a higher vibration level of the ground state S0 by an induced emission process. Hence, the fluorescence suppression effect is further enhanced. In other words, with emission of light of wavelength $\lambda_2$, a fluorescence yield emitted from the first excited state S1 is reduced. Accordingly, the fluorescence suppression effect is presented if the molecule is forced to transition to a quantum level. Examples of materials having such properties are photochromic molecules, fluorescent substances including rare earth, quantum dots, and the like.

Such a phenomenon is extremely significant from the perspective of the application field of the microscope. That is, conventional scanning microscopes and the like condense a laser beam into a microbeam by using a collective lens and scan the sample. At that time, the size of the microbeam falls to a diffraction limit determined by the numerical aperture of the collective lens and the wavelength. Therefore, further spatial resolution cannot be expected in principle.

In the case illustrated in FIG. 27, however, the fluorescence area is controlled by light of two wavelengths, wavelength $\lambda_1$ and wavelength $\lambda_2$, that partially overlap spatially. Therefore, for example examining the emission area of light of wavelength $\lambda_1$, the fluorescence area can be made narrower than the diffraction limit that is determined by the numerical aperture of the collective lens and the wavelength, substantially allowing for improvement in the spatial resolution. Accordingly, by taking advantage of this principle, it is possible to achieve a super-resolution microscope that adopts the double resonance absorption process and exceeds the diffraction-limited resolution, such as a super-resolution fluorescence microscope.

When using rhodamine 6G, for example, if light with a wavelength of 532 nm (pumping light; first illumination light) is emitted, rhodamine 6G molecules are excited from the ground state S0 to the first excited state S1 and emit fluorescence with a peak at a wavelength of 560 nm. At this time, emitting light with a wavelength 599 nm (erasing light; second illumination light) triggers the double resonance absorption process, and the rhodamine 6G molecules transition to the second excited state, in which fluorescent emission is difficult. In other words, simultaneous irradiation of rhodamine 6G with the pumping light and the erasing light suppresses fluorescence.

FIG. 28 is a configuration diagram of the main section of a conventionally proposed super-resolution microscope. This super-resolution microscope assumes a usual laser scanning type fluorescence microscope and is mainly composed of three independent units, namely a light source unit 210, a scanning unit 230, and a microscope unit 250.

The light source unit 210 has a pumping light source 211 and an erasing light source 212. The pumping light emitted from the pumping light source 211 is incident on a dichroic prism 213 and is reflected thereby. The erasing light emitted from the erasing light source 212 is incident on the dichroic prism 213 after being subjected to spatial modulation of its phase by a phase plate 215, is transmitted through the dichroic prism 213, and then exits after being coaxially combined with the pumping light.

When observing a sample stained with rhodamine 6G, as the pumping light, the pumping light source 211 can be configured, using a Nd:YAG laser, to emit light with a wavelength of 532 nm, which is the second harmonic wave of the laser. As the erasing light, the erasing light source 212 can also be configured, using a Nd:YAG laser and a Raman shifter, to emit light that is the second harmonic wave of the Nd:YAG laser modulated into light with a wavelength of 599 nm by the Raman shifter.

The phase plate 215 modulates the phase of the erasing light and, for example, has a pupil plane radially divided into eight regions about an optical axis as illustrated in FIG. 29. Each region is established by etching a glass substrate or forming optical multilayer films on a glass substrate so that the phase difference of the erasing light revolves about the optical axis over $2\pi$. When the erasing light transmitted through the phase plate 215 is collected, a hollow erasing light with the electric field canceled along the optical axis is generated.

After transmitting the pumping light and the erasing light, coaxially emitted from the light source unit 210, through a half prism 231, the scanning unit 230 performs swing scanning in two dimensions with two galvano mirrors 232 and 233 to emit the light to the microscope unit 250, described below. In addition, with the half prism 231, the scanning unit 230 branches fluorescence that is incident from the microscope unit 250 and travels the opposite path from the outgoing light. The branched fluorescence is received by a photodetector 238, such as a photomultiplier, via a projector lens 234, a pinhole 235, and notch filters 236 and 237.

To simplify the diagram, the galvano mirrors 232 and 233 are illustrated as being swingable in the same plane in FIG. 28. The notch filters 236 and 237 eliminate the pumping light and the erasing light mixed into the fluorescence. In addition, the pinhole 235 is an important optical element composing a confocal optical system and transmits only fluorescence emitted by a particular cross-section in the sample being observed.

The microscope unit 250 is a usual fluorescence microscope which reflects the pumping light and the erasing light incident from the scanning unit 230 with a half prism 251 and collects the light, using a microscope objective lens 252, on a sample S containing molecules with at least three electron states including the ground state. The fluorescence emitted by the sample S is collimated by the microscope objective lens 252 again and reflected by the half prism 251 so as to be returned to the scanning unit 230, while a part of the fluorescence transmitted through the half prism 251 is led to an eyepiece 254 to allow for visual observation as a fluorescence image.

According to this super-resolution microscope, fluorescence is suppressed except near the optical axis, at which the intensity of the erasing light becomes zero on a light collection point of the sample S. As a result, it is possible to measure only fluorescence labeler molecules located in a region narrower than the expansion of the pumping light. Accordingly, by arranging fluorescent signals at each measurement point in a two-dimensional array on a computer, it is possible to form a microscopic image having a resolution exceeding the spatial resolution of the diffraction limit.

In the conventional super-resolution microscope illustrated in FIG. 28, however, during adjustment of imaging performance or microscope assembly for practical use, there is concern that disturbance of the wave front may occur in the erasing light, or that optical adjustment of the erasing light and the pumping light will become difficult.

For example, in the super-resolution microscope in FIG. 28, the phase plate 215 is provided immediately after the erasing light source 212, and after being spatially modulated by the phase plate 215, the erasing light is optically adjusted along the same axis as the pumping light by the dichroic prism 213 and introduced into the scanning unit 230. In this case, optical adjustment of the pumping light and the erasing light becomes particularly problematic. The reason is that if the light paths of the pumping light and erasing light are not aligned to be completely coaxial, the focus spots of these two colors of light do not match on the focal plane.

In other words, in super-resolution microscopy, completely matching the peak position of the pumping light in the central hollow region of the erasing light is a necessary condition. For example, in the focal plane, if the peak position of the pumping light shifts to the periphery of the erasing light, the entire collected pumping light undergoes fluorescence suppression. Therefore, not only does the resolution of the microscope degrade, but also S/N is dramatically reduced.

A super-resolution microscope that can easily align pumping light and erasing light coaxially has also been proposed (for example, see Patent Literature 3). This super-resolution microscope uses the phase plate 300 illustrated in FIGS. 30A and 30B. FIG. 30A is a cross-sectional diagram schematically illustrating the structure of the phase plate 300, and FIG. 30B is a plan view. This phase plate 300 has an annular structure including a central region 310 divided into concentric circular portions and a peripheral region 320. The central region 310 includes optical multilayer films 311 formed on a transparent optical substrate 330 of glass or the like. The peripheral region 320 is, for example, composed of the optical substrate 330. FIG. 31 illustrates optical properties of the phase plate 300. The central region 310 reflects the pumping light and transmits the erasing light while inverting the phase thereof by π. The peripheral region 320 transmits both the pumping light and the erasing light without applying phase modulation.

The phase plate 300 illustrated in FIGS. 30A and 30B can provide the pumping light and the erasing light with different refractive indices by optimizing the total number, film thickness, and material of the optical multilayer films 311. As a result, a phase delay that is an integer multiple of the wavelength can be generated in the pumping light, allowing for the pumping light to be adjusted without undergoing phase modulation. Therefore, the pumping light and the erasing light can be caused to enter coaxially, with only the erasing light formed as a hollow beam.

FIG. 32 illustrates an example of the structure of a super-resolution microscope using the above-described phase plate 300. This super-resolution microscope differs from the super-resolution microscope illustrated in FIG. 28 in the structure of the light source unit 210 and microscope unit 250.

Specifically, the light source unit 210 includes a pumping light source 221, an erasing light source 222, a beam combiner 223 composed of a dichroic prism or a polarizing prism, a fiber collective lens 224, a single mode fiber 225, and the fiber collimator lens 226. The pumping light emitted by the pumping light source 221 and the erasing light emitted by the erasing light source 222 are combined nearly coaxially by the beam combiner 223. The pumping light and erasing light emitted from the beam combiner 223 are incident on the single mode fiber 225 nearly coaxially via the fiber collective lens 224 and are emitted from the single mode fiber 225 as a perfect spherical wave with an aligned solid angle of emission. The pumping light and erasing light emitted from the single mode fiber 225 are converted into a plane wave by the fiber collimator lens 226, which has no chromatic aberration, and are introduced into the scanning unit 230.

When observing a sample stained with rhodamine 6G, a He—Ne laser that emits a continuous wave with an emission line having a wavelength of 543 nm is, for example, used as the pumping light source 221. A He—Ne laser that emits a continuous wave with an emission line having a wavelength of 633 nm is, for example, used as the erasing light source 222.

The microscope unit 250 differs from the structure in FIG. 28 in that the above-described phase plate 300 and an iris (adjustable diaphragm) 261 are disposed along a light path between the half prism 251 and the microscope objective lens 252. The phase plate 300 and the iris 261 are disposed on or near the pupil plane in the microscope unit 250. Only the erasing light is spatially modulated by the phase plate 300 to become hollow. The spatially modulated erasing light and the non-spatially modulated pumping light are then collected on the sample S by the microscope objective lens 252 via the iris 261. Note that the phase plate 300 is optimized for the wavelength of the pumping light and the erasing light. In this way, the sample S is irradiated with erasing light having a beam shape in a hollow pattern with a hollow portion along the optical axis (i.e. a donut shape).

Note that in FIG. 32, the scanning unit 230 and the microscope unit 250 are connected by a pupil projection optical system 270. The remaining structure is similar to FIG. 28, and thus a description thereof is omitted. The super-resolution microscope illustrated in FIG. 32 may be achieved by adding on the phase plate 300 and the iris 261 to a commercial laser scanning type microscope.

Experimental investigation by the inventor, however, revealed that due to defects caused by the principle of the optical multilayer films and the film formation process thereof, the phase plate 300 illustrated in FIGS. 30A and 30B adversely affects the imaging performance of the super-resolution microscope. In other words, by alternately stacking materials that in principle have different refractive indices in the optical multilayer films, interference by multiple reflection of incident light within the films is used to control phase. When the phase plate 215 illustrated in FIG. 29 is configured with optical multilayer films, the glass substrate surface forming the phase plate is divided into multiple regions, and optical multilayer films with different designs are coated so as to generate a different phase delay in each region.

In many cases, an optical design that generates a phase delay functioning as a super-resolution microscope for pumping light and erasing light is possible. Optimization of the corresponding transmittance, however, is difficult. In other words, the beam that has passed through each region varies in intensity in accordance with the transmittance of each region. Therefore, the shape of the collected pumping light and erasing light is disturbed. In particular, since the erasing light is modified to have a hole in the center, axial symmetry is greatly impaired. This leads to degradation of the super-resolution function.

Furthermore, in the optical multilayer films, the refractive index changes suddenly at each layer interface. Therefore, in many cases, even though the refractive index of each layer is extremely low, reflected light is generated at the back face of the layer (back reflected light). In particular, since the erasing light is intense in a super-resolution microscope, erasing light mixes into the fluorescence image as background light due to the back reflected light. Furthermore, in the case of the structure illustrated in FIG. 29, a phase deviated from the design value occurs in each divided region due to error in film thickness during manufacturing. For these reasons, the erasing light has a beam shape that deviates from the theoretical value, resulting in degradation of the super-resolution function.

Currently, two types of phase modulation methods are known as methods for generating hollow erasing light. One method, referred to as a Laguerre-Gaussian beam, changes the phase of the beam around the optical axis by an integer multiple of $2\pi$. Upon collecting such a beam, the electric field intensity cancels out along the optical axis, thus forming a beam with a three-dimensional macaroni shape. In particular, an extremely fine donut pattern is obtained on the focal plane. As a result, extremely high lateral resolution is achieved with super-resolution microscopy. The phase plate 215 with the structure illustrated in FIG. 29, for example, is known as a phase plate used to generate such a beam (also referred to below as a spiral phase plate).

The other method inverts the phase of an annular region in the central portion of the erasing light by $\pi$. Upon collecting such a beam, a three-dimensional space that is not irradiated by light is generated only at and near the focal point due to interference of light. In this case, a hollow shape can also be formed in the optical axis direction, and therefore by using this erasing light, the spot contracts in particular in the axial direction, and a super-resolution function in the optical axis direction, i.e. longitudinal resolution, can also be achieved. The phase plate 300 with the structure illustrated in FIGS. 30A and 30B, for example, is known as a phase plate used to generate such a beam (also referred to below as an annular phase plate).

Experimental investigation by the inventor, however, revealed characteristics requiring improvement in both phase modulation methods. Specifically, in a Laguerre-Gaussian beam obtained by using a spiral phase plate, a super-resolution function in the optical axis direction is not obtained since the beam has a macaroni shape. Conversely, a three-dimensional hollow center is obtained when using an annular phase plate, yet since the diameter of the hollow center in the focal plane is larger than the Laguerre-Gaussian beam, a good super-resolution function is not obtained in the lateral direction (see Y. Iketaki, and N. Bokor, Opt. Commun. 285, 3798-3804 (2012)).

CITATION LIST

Patent Literature

PTL 1: JPH8-184552A
PTL 2: JP2001-100102A
PTL 3: JP2010-15026A

SUMMARY OF INVENTION

A super-resolution microscope according to an aspect of the present invention is a super-resolution microscope for observing a sample including a molecule having at least two excited quantum states, the super-resolution microscope comprising: an illumination optical system configured to collect first illumination light and second illumination light on the sample by partially spatially overlapping the lights to irradiate the sample, the first illumination light being for exciting the molecule from a stable state to a first quantum state and the second illumination light being for causing the molecule to transition further to another quantum state; a scanning unit configured to scan the sample by displacing the sample relative to the first illumination light and the second illumination light; a detection unit configured to detect a light response signal generated by the sample due to irradiation with the first illumination light and the second illumination light; and a modulation optical element disposed in the illumination optical system along a light path traveled by the first illumination light and the second illumination light and configured to spatially modulate the second illumination light, wherein in the modulation optical element, a plurality of optical substrates exhibiting anisotropy in a refractive index distribution are joined in a coplanar manner, and at least two of the optical substrates have a different refractive index with respect to a polarization direction of the second illumination light.

A modulation optical element according to an aspect of the present invention can be used in the above super-resolution microscope and comprises a plurality of optical substrates joined in a coplanar manner and exhibiting anisotropy in a refractive index distribution, wherein at least two of the optical substrates have a different refractive index with respect to a polarization direction of incident light.

A super-resolution microscope according to another aspect of the present invention is a super-resolution microscope for observing a sample including a molecule having at least two excited quantum states, the super-resolution microscope comprising: an illumination optical system configured to collect first illumination light and second illumination light on the sample by partially spatially overlapping the lights to irradiate the sample, the first illumination light being for exciting the molecule from a stable state to a first quantum state and the second illumination light being for causing the molecule to transition further to another quantum state; a scanning unit configured to scan the sample by displacing the sample relative to the first illumination light and the second illumination light; a detection unit configured to detect a light response signal generated by the sample due to irradiation with the first illumination light and the second illumination light; and a modulation optical element disposed in the illumination optical system along a light path traveled by the first illumination light and the second illumination light and configured to spatially modulate the first illumination light and the second illumination light, wherein in the modulation optical element, a plurality of optical substrates having different polarization properties with respect to the first illumination light and the second illumination light are joined in a coplanar manner, and each optical substrate has stacked thereon an optical thin film with different optical properties.

A modulation optical element according to another aspect of the present invention can be used in the above super-resolution microscope and comprises a plurality of optical substrates joined in a coplanar manner and having different polarization properties with respect to light of different wavelengths; and an optical thin film with different optical properties stacked on each optical substrate.

According to the present invention, it is possible to provide a super-resolution microscope yielding a good super-resolution function and a modulation optical element that can be used therein.

BRIEF DESCRIPTION OF DRAWINGS

The present invention will be further described below with reference to the accompanying drawings, wherein:

FIG. 1 is a plan view of the modulation optical element used in Embodiment 1;

FIG. 2 illustrates the method of manufacturing the modulation optical element in FIG. 1;

FIG. 7 conceptually illustrates the structure of a super-resolution microscope according to Embodiment 1;

FIGS. 16A and 16B illustrate a comparison of the results of simulating the collected beam shape of erasing light when using the modulation optical element in FIG. 13 and when using the modulation optical element in FIG. 15;

DESCRIPTION OF EMBODIMENTS

Figure 3A:
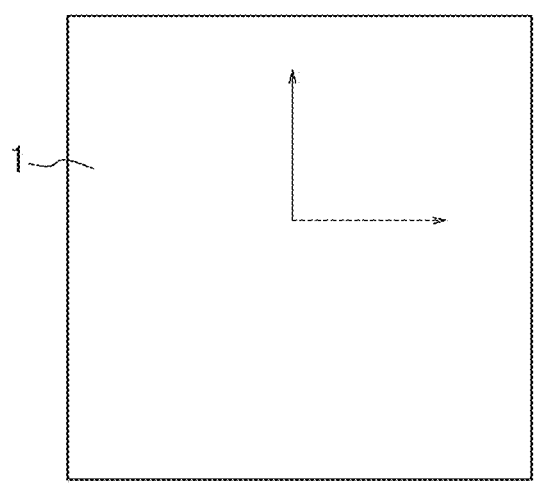
FIGS. 3A and 3B illustrate the quartz substrate produced in the orientation and cutting step in FIG. 2.

The following describes embodiments of the present invention with reference to the drawings.

Embodiment 1

First, the modulation optical element used in the super-resolution microscope according to Embodiment 1 is described. The modulation optical element used in the present embodiment is produced by polishing and cutting optical substrates, without using an optical thin film. Specifically, the modulation optical element is produced by joining optical substrates with different polarization properties in a coplanar manner and optically polishing the optical substrates integrally.

A phase plate using an optical thin film, which is a conventional technique, controls the phase velocity of light passing through the phase plate by optimizing the refractive index of the medium. Conversely, an optical substrate composed of a birefringent medium, such as an optical substrate having a cut face in a different direction than the crystal axis, for example quartz, converts transmitted light to a different polarization state than incident light. Focusing on this effect, the modulation optical element used in the present embodiment uses the spatial distribution of the electric field vector of transmitted light to modulate the beam.

For example, quartz has a cut face for which the refractive index difference is maximized in perpendicular axial directions. Among these, the axis in the direction with the higher refractive index is referred to as the phase delaying axis, and the axis in the direction with the lower refractive index is referred to as the phase advancing axis. When linearly-polarized light strikes such a modulation optical element, the transmitted light is converted to light in which the polarization state, i.e. the spatial electric field, has a different direction of oscillation.

Under the condition of the thickness and cut surface of the quartz substrate being optimized, various types of polarization control are possible when, for example, linearly-polarized light strikes at predetermined angle with respect to the phase delaying axis. For example, if a phase difference of 180° exists between the electric field component parallel to the phase delaying axis and the perpendicular component, linearly-polarized light that oscillates in a completely opposite direction from the incident light is obtained. If the phase difference is 360°, the light is transmitted through the substrate with the original polarization state. If the phase difference is 90°, well-known circularly-polarized light is obtained. Focusing on these properties, the erasing light at the microscope focal point region can be formed to be hollow by joining the above-described quartz substrates.

FIG. 1 is a plan view of the modulation optical element used in Embodiment 1. The modulation optical element 10 includes a cylindrical substrate 1a and an annular substrate 1b that are joined concentrically. The cylindrical substrate 1a and the annular substrate 1b are each composed of a quartz substrate having an orthogonal phase advancing axis (indicated by the solid arrow) and phase delaying axis (indicated by the dashed arrow). The cylindrical substrate 1a and the annular substrate 1b are joined so that the phase advancing axis of the cylindrical substrate 1a is orthogonal to the phase advancing axis of the annular substrate 1b.

FIG. 2 illustrates the method of manufacturing the modulation optical element 10 in FIG. 1. First, the orientation of the quartz substrate is adjusted, and the quartz substrate is cut (S201). In the orientation and cutting step, as illustrated by the plan view and side view of the quartz substrate 1 in FIGS. 3A and 3B, the cut face is adjusted so that the phase advancing axis and the phase delaying axis are perpendicular upon exiting the substrate, and the substrate thickness d is adjusted so that the phase difference of the electric field is 180° at the wavelength of the erasing light, i.e. to function as a half-wave plate, and to function as a full-wave plate with respect to the pumping light. The quartz substrate 1 is then cut to yield two quartz substrates.

Figure 4:
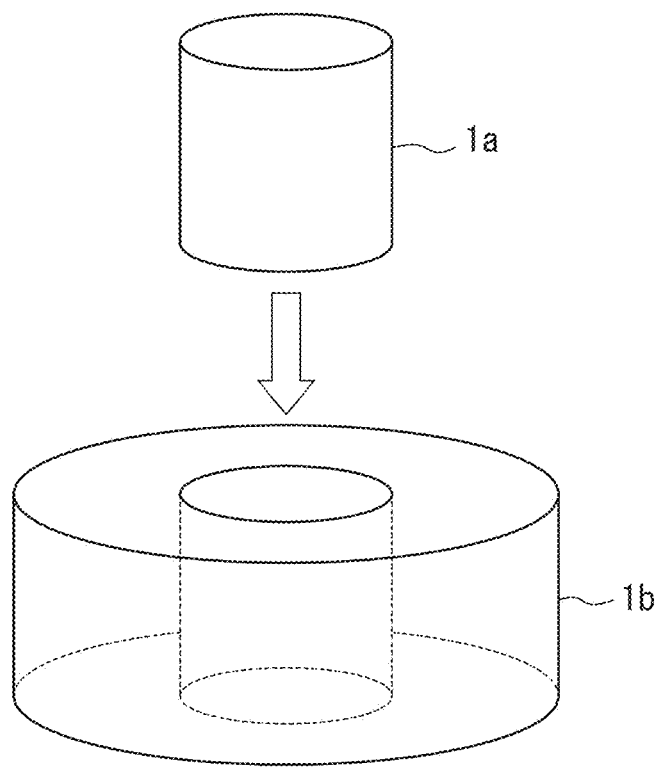
FIG. 4 illustrates the cylindrical substrate and annular substrate produced in the rounding step in FIG. 2.

Next, the two quartz substrates are rounded (S203). During the rounding step, as illustrated in FIG. 4, one of the two quartz substrates is rounded into a cylinder to form the cylindrical substrate 1a, and the other quartz substrate is rounded into an annular shape to form the annular substrate 1b. The cylindrical substrate 1a is formed to have an outside diameter that can be joined to the inside diameter of the annular substrate 1b.

Subsequently, ultraviolet curable resin is applied to the circumferential surface of the cylindrical substrate 1a and/or to the inner circumferential surface of the annular substrate 1b, the cylindrical substrate 1a is inserted into the inside diameter of the annular substrate 1b, and the substrates are irradiated with ultraviolet light. As a result, the cylindrical substrate 1a and the annular substrate 1b are adhered concentrically (S205). At this time, orientations are measured so that the phase advancing axis of the cylindrical substrate 1a and the phase advancing axis of the annular substrate 1b are perpendicular. Next, the cylindrical substrate 1a and the annular substrate 1b are integrally subjected to preliminary polishing and cutting (S207), and while measuring polarization with a polarimeter and measuring surface accuracy with an interferometer (S209), polishing for adjustment is performed (S211), yielding a modulation optical element 10 as illustrated in FIG. 1. Subsequently, if necessary, the modulation optical element 10 is coated with an antireflection film to prevent reflection of the erasing light.

Figure 5:
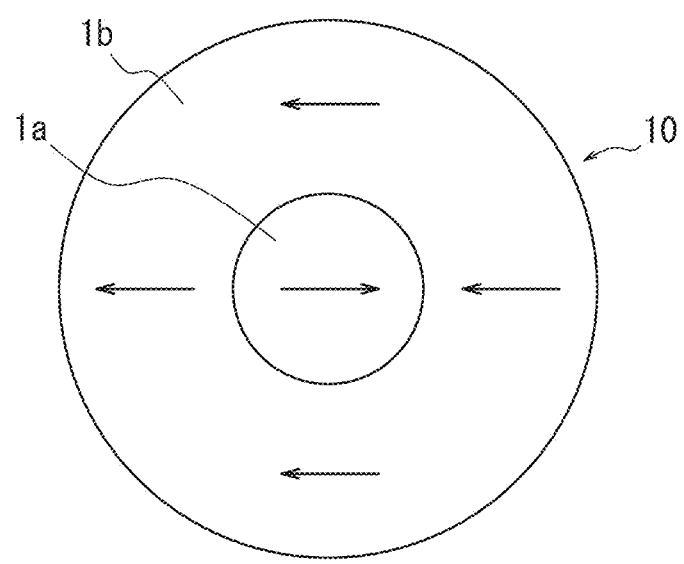
FIG. 5 illustrates the orientation of the electric field vector of transmitted light when linearly-polarized light passes through the modulation optical element in FIG. 1.

When linearly-polarized light parallel to the phase advancing axis of the annular substrate 1b is incident on the modulation optical element 10 with the above structure, the incident linearly-polarized light is parallel to the phase delaying axis of the inner cylindrical substrate 1a. Therefore, when the linearly-polarized erasing light passes through the modulation optical element 10, the electric field vectors are opposite for the light transmitted through the outer annular substrate 1b and the light transmitted through the inner cylindrical substrate 1a, as illustrated in FIG. 5. That is, the erasing light is modulated to be linearly-polarized light such that the oscillation axis of the electric field is in the same direction and the orientation of the electric field is reversed.

Figure 30A:
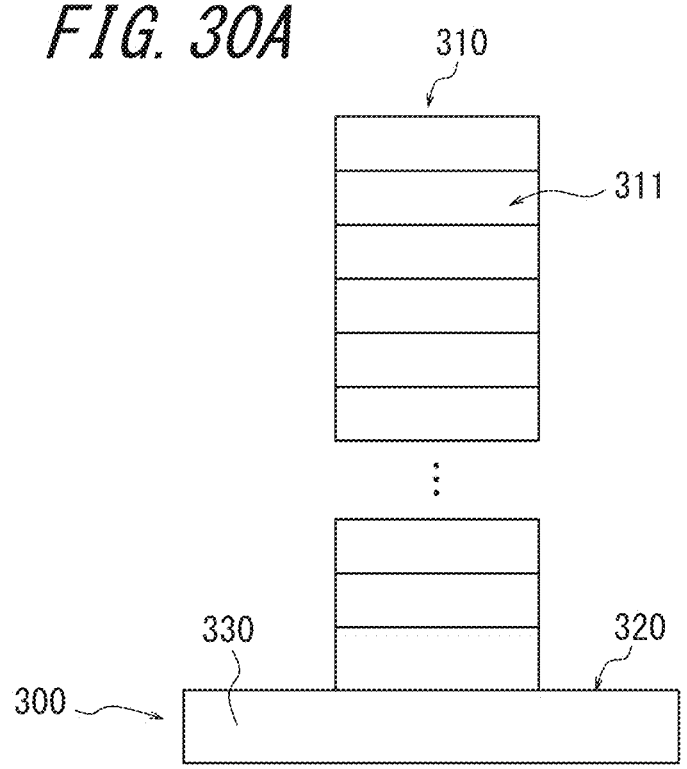
FIGS. 30A and 30B illustrate the structure of another conventional phase plate.
Figure 30B:
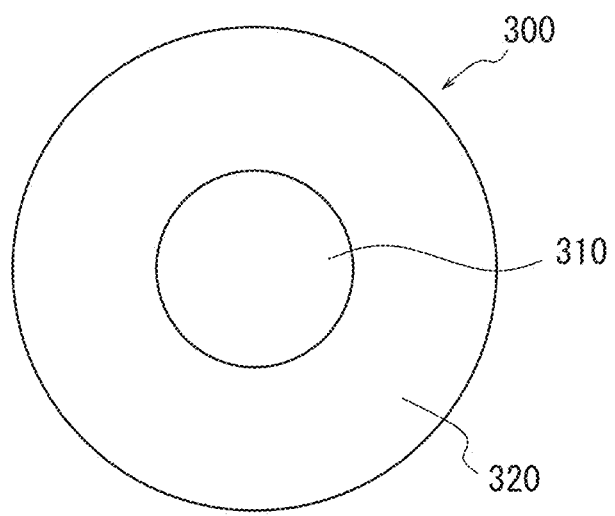
Figure 31:
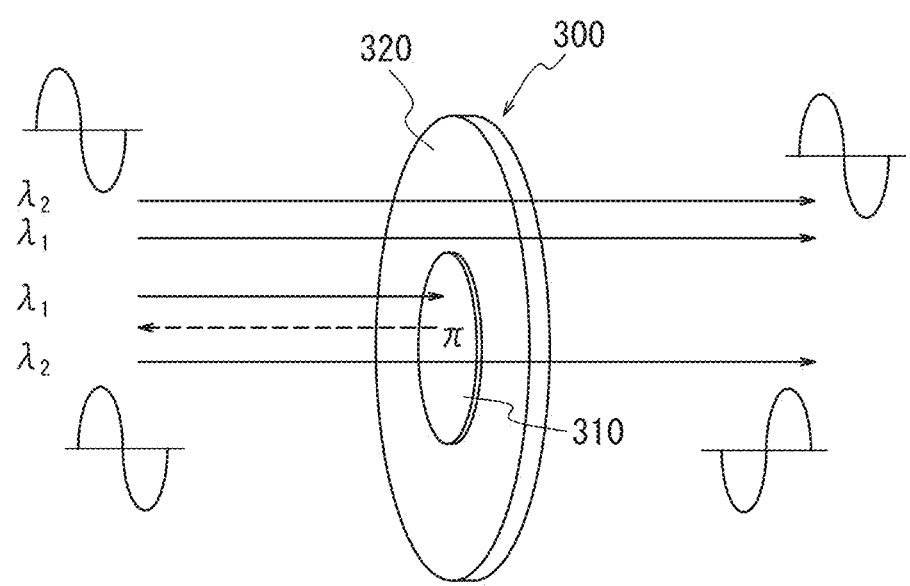
FIG. 31 illustrates the optical properties of the phase plate in FIGS. 30A and 30B.
Figure 32:
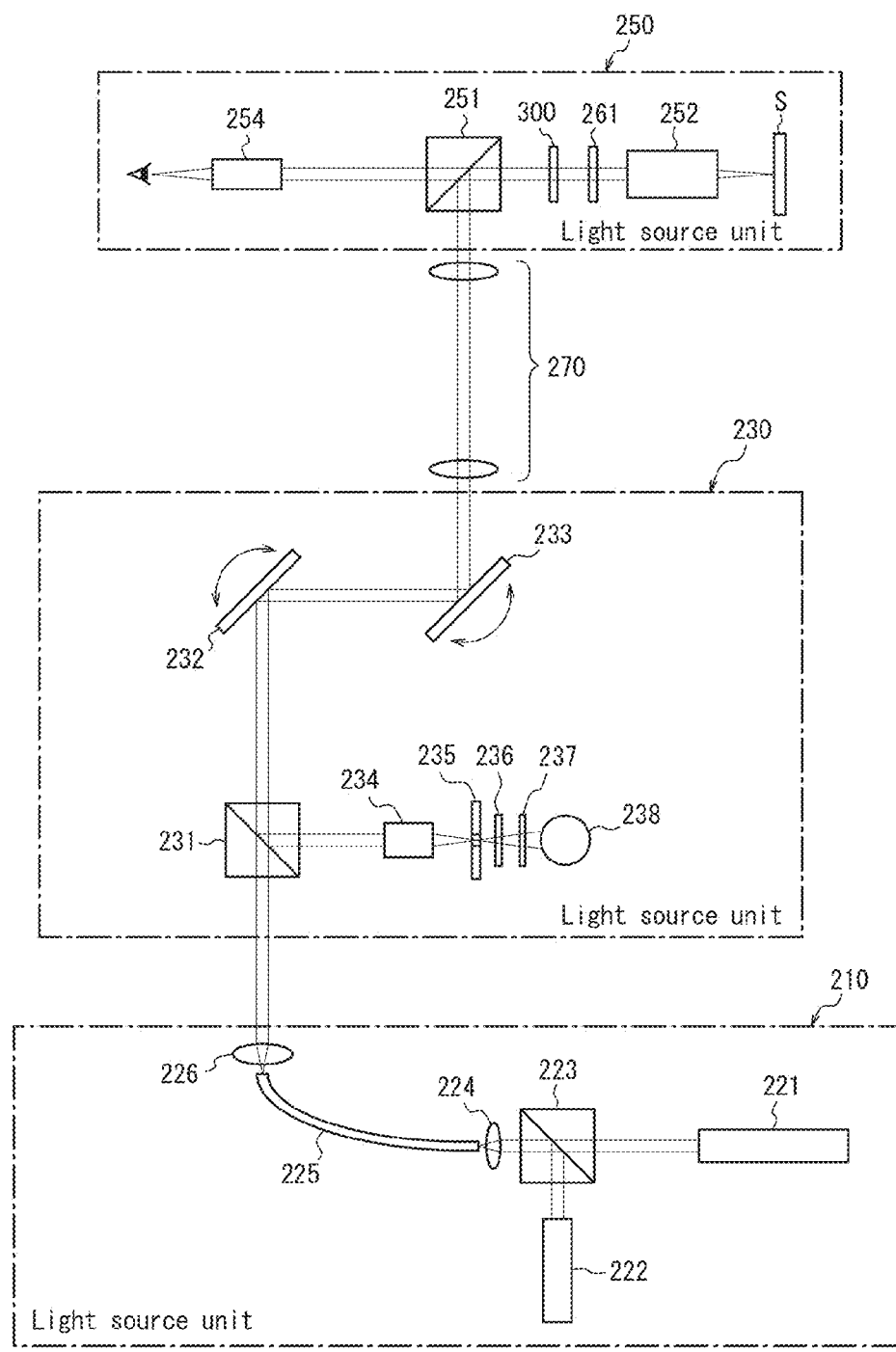
FIG. 32 is a configuration diagram of the main section of a conventional super-resolution microscope using the phase plate in FIGS. 30A and 30B.

Therefore, upon collecting the light passing through the modulation optical element 10 with an objective lens, the electric field amplitude is offset near the focal point. In particular, by adjusting the ratio between the area of the region of the inner cylindrical substrate 1a and the area of the region of the outer annular substrate 1b through which the erasing light passes, a region that is not irradiated by light can be generated at and near the focal point. This effect has exactly the same function as the multilayer film phase plate illustrated in FIGS. 30A and 30B that inverts the phase at the annular central portion by π. Furthermore, since the collected erasing light has a hollow structure in the optical axis direction, a super-resolution function is derived not only within a plane but also in the optical axis direction.

Moreover, the modulation optical element 10 in FIG. 1 allows for independent polarization control with respect to the pumping light as well. In the super-resolution microscope, it is preferable, insofar as possible, for the shape of the pumping light not to be affected by polarization (for example, see Y. Iketaki, "Three-dimensional super-resolution microscope using two-color annular phase plate", Appl. Phys. Express 3, 085203 (2010)). The reason is that if such a joint substrate with dichroic polarization properties exists, a super-resolution function can be added by simply inserting the joint substrate into the illumination optical system of a commercial laser scanning type microscope.

In other words, between axial directions perpendicular when passing through the substrate, it suffices to add a phase difference $\phi_e$ indicated by Equation (1) below to the erasing light and a phase difference $\phi_p$ indicated by Equation (2) below to the pumping light. In Equations (1) and (2), m and n are integers.

$$\phi_e = \pi + 2m \times \pi \quad (1)$$

$$\phi_p = 2n \times \pi \quad (2)$$

Figure 3B:
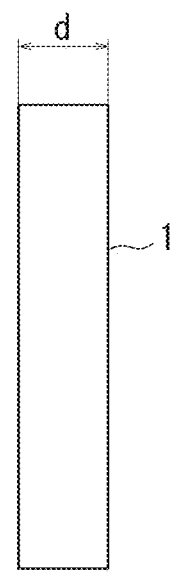

If these conditions are satisfied, the phase difference of the pumping light becomes an integer multiple of the wavelength, and therefore the polarization state of the pumping light that passes through the substrates appears not to have changed at all. In other words, the two wavelengths fulfill exactly the same function as the multilayer film phase plate illustrated in FIGS. 30A and 30B. In practice, the thickness d of the quartz substrate 1 in FIGS. 3A and 3B is adjusted to search for conditions near Equations (1) and (2).

Note that the conditions of Equations (1) and (2) need not be satisfied strictly for the pump beam. The reason is that the resolution of the super-resolution microscope is nearly determined by the spatial configuration of the erasing light, yet since fluorescence is eliminated in the area where the erasing light and the pumping light overlap spatially, the fluorescence area remaining due to the configuration of the intensity distribution in the hollow portion of the erasing light is determined even if the collection configuration of the pumping light degrades to some extent.

As a limit on the disturbance of the pumping light configuration, it suffices for at least $\phi_p$ to be less than 90° (¼ wavelength). Within this range, the polarization state becomes that of circularly-polarized light, whereas the direction of oscillation of the electric field within the beam surface is not inverted. Accordingly, even if the light passing through the annular substrate 1b of the modulation optical element 10 and the light passing through the cylindrical substrate 1a overlap, it is not the case that the directions of the electric field are exactly opposite, causing the electric field intensity to cancel out. In other words, in the pumping light, the beam shape changes slightly, yet the light is collected in a shape near a regular Gaussian beam.

The following describes a specific example of the modulation optical element 10. In the example laser resolution microscope, it is assumed that light with a wavelength ($\lambda_p$) of 532 nm from a Nd:YVO$_4$ laser is used as the pumping light, and light with a wavelength ($\lambda_e$) of 647 nm from a krypton laser is used as the erasing light. Table 1 lists the refractive index of the quartz substrate used in the modulation optical element 10 in this case. Note that in Table 1, $n_o$ is the refractive index of the phase advancing axis, and $n_e$ is the refractive index of the phase delaying axis.

TABLE 1

| | $\lambda_p$ = 532 nm | $\lambda_e$ = 647.1 nm |
|---|---|---|
| Phase advancing axis: $n_o$ | 1.54689 | 1.54218 |
| Phase delaying axis: $n_e$ | 1.55651 | 1.55185 |
| Difference in refractive index between axes: $n_e - n_o$ | 0.00962 | 0.00967 |

A quartz substrate having the refractive index properties in Table 1 is cut out and used for the modulation optical element 10 illustrated in FIG. 1. In this modulation optical element 10, the upper direction in FIG. 1 becomes the phase advancing axis of the outer annular substrate 1b and the phase delaying axis of the inner cylindrical substrate 1a. Accordingly, upon incidence of linearly-polarized erasing light onto the modulation optical element 10, a difference in light path occurs in accordance with the difference in refractive index between axes $(n_e-n_o)$ of 0.00967 and the substrate thickness d. Similarly, upon incidence of linearly-polarized pumping light, a difference in light path occurs in accordance with the difference in refractive index of 0.00962 and the substrate thickness d.

Figure 6A:
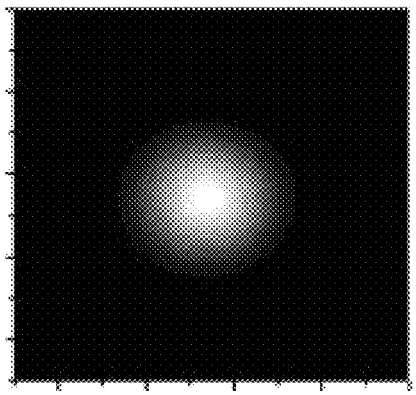
FIGS. 6A and 6B illustrate the results of simulating the beam shape of pumping light and erasing light on the focal plane when using the modulation optical element in FIG. 1.
Figure 6B:
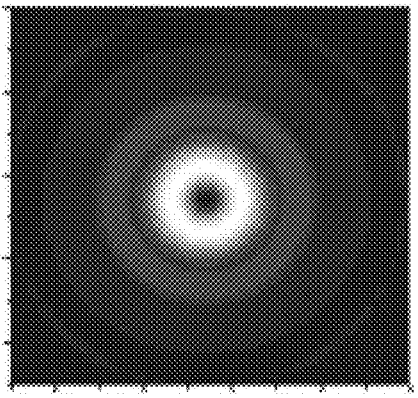

Upon setting the thickness d to be, for example, 1438.436 μm, $\phi_e$ becomes 180° and functions as a half-wave plate, yet $\phi_e$ becomes 3.9°, and a certain phase difference occurs. In this case, FIGS. 6A and 6B illustrate the results of a simulation of the beam shape in the microscope focal plane (xy plane) for the pumping light and the erasing light, and the effect of the phase difference of the pumping light can be completely ignored. Note that the simulation illustrated in FIGS. 6A and 6B can be performed in accordance with the disclosure in, for example, N. Bokor and N. Davidson, Opt. Comm. 270 (2), 145 (2007). Therefore, if pumping light and erasing light are caused to enter the modulation optical element 10 coaxially and are collected by a microscope objective lens, the erasing light is collected in a doughnut shape on the focal plane, despite the pumping light being collected as a regular Gaussian beam.

Focusing on this function, a super-resolution function can easily be added by simply inserting the above modulation optical element 10 into the illumination optical system of a commercial laser scanning type microscope. Currently, in commercial laser scanning type microscope systems, laser light at a plurality of wavelengths is introduced into a microscope unit using a shared polarization-maintaining single mode fiber, as seen for example in FV1200 (product name; manufactured by Olympus Corporation).

In this microscope system, the exit of the single mode fiber is minute enough to be considered a point light source, and therefore spatial coherence is guaranteed for all of the light emitted from the single mode fiber. Furthermore, the polarization state is uniformly standardized to a state of linearly-polarized light. After the laser light emitted from the single mode fiber is converted to parallel light by a collimator lens, the light passes through a bandpass filter and is introduced into a galvano mirror optical system.

The light exiting the galvano mirror optical system passes through a pupil projection lens and is collected on a sample surface by an objective lens. The fluorescence emitted from the sample passes through the objective lens, is sent back through the galvano mirror optical system, is reflected by the bandpass filter to be separated from the light path of the illumination light, and is led to a photodetector. A super-resolution microscope can easily by configured by inserting the above-described modulation optical element 10 into the laser light path from the single mode fiber in a microscope system with the above structure.

FIG. 7 conceptually illustrates the structure of a super-resolution microscope according to Embodiment 1 of the present invention. This super-resolution microscope is a commercial laser scanning type microscope system into which the above-described modulation optical element 10 has been inserted. In the present embodiment, light with a wavelength $(\lambda_p)$ of 532 nm from a Nd:YVO$_4$ laser is used as the pumping light, and light with a wavelength $(\lambda_e)$ of 647 nm from a krypton laser is used as the erasing light to observe a sample stained with a xanthene series rhodamine dye or oxazine series Nile red.

The pumping light and erasing light are combined coaxially using a non-illustrated well-known beam combiner and are caused to enter a single mode fiber 21. After the pumping light and erasing light emitted from the single mode fiber 21 are collimated together by a collimator lens 22, the lights pass through an iris 23, the modulation optical element 10, and a bandpass filter 24 to be led into a galvano mirror optical system 25. The pumping light and erasing light led into the galvano mirror optical system 25 are deflection scanned in two dimensions by the galvano mirror optical system 25, pass through a pupil projection lens 26, and are collected on a sample S by an objective lens 27.

The single mode fiber 21, collimator lens 22, pupil projection lens 26, and objective lens 27 constitute an illumination optical system. The galvano mirror optical system 25 constitutes a scanning unit. The beam diameter of the erasing light incident on the modulation optical element 10 is adjusted along with the pumping light so as to satisfy interference conditions to yield a completely hollow shape on the focal plane of the objective lens 27. The bandpass filter 24 is configured to transmit the pumping light and the erasing light and to reflect fluorescence from the sample.

The fluorescence emitted from the sample S due to illumination by the pumping light travels the opposite light path from the illumination light composed of the pumping light and the erasing light, strikes and is reflected by the bandpass filter 24, and is separated from the light path of the illumination optical system. After only fluorescence is extracted with a block filter 31, the fluorescence reflected by the bandpass filter 24 is collected by a collective lens 32, passes through a pinhole 33, and is received by a photodetector 34, such as a photomultiplier, that constitutes a detection unit.

According to the super-resolution microscope of the present embodiment, when pumping light and erasing light simultaneously shine on the sample S, these beams are collected at exactly the same position, without misalignment, on the focal plane of the objective lens 27. At that time, only the erasing light is adjusted to a hollow shape in order to contribute to achieving the super-resolution microscope. The sample S can thus be observed at super resolution.

The entire surface of the modulation optical element 10 can be coated with an antireflection film to prevent reflection of the erasing light. In the case of a super-resolution microscope, scattered light is generated from the erasing light. In the case of the multilayer film phase plate illustrated in FIGS. 30A and 30B, when an antireflection film is newly coated, the phase distribution designed with film error is affected, which may cause the beam shape of the collected erasing light to be distorted, leading to worsening of S/N for the measured image.

In the modulation optical element 10 illustrated in FIG. 1, however, the antireflection film is directly coated onto a substrate optically polished without relation to phase. Hence, accuracy of the wave front is guaranteed. Therefore, even if the modulation optical element 10, which can easily be inserted, is for example inserted immediately before the objective lens, and faint fluorescence competes with the illumination optical path, reflected light from the erasing light can still be reduced insofar as possible, so that the S/N of the measured image does not degrade.

Figure 8:
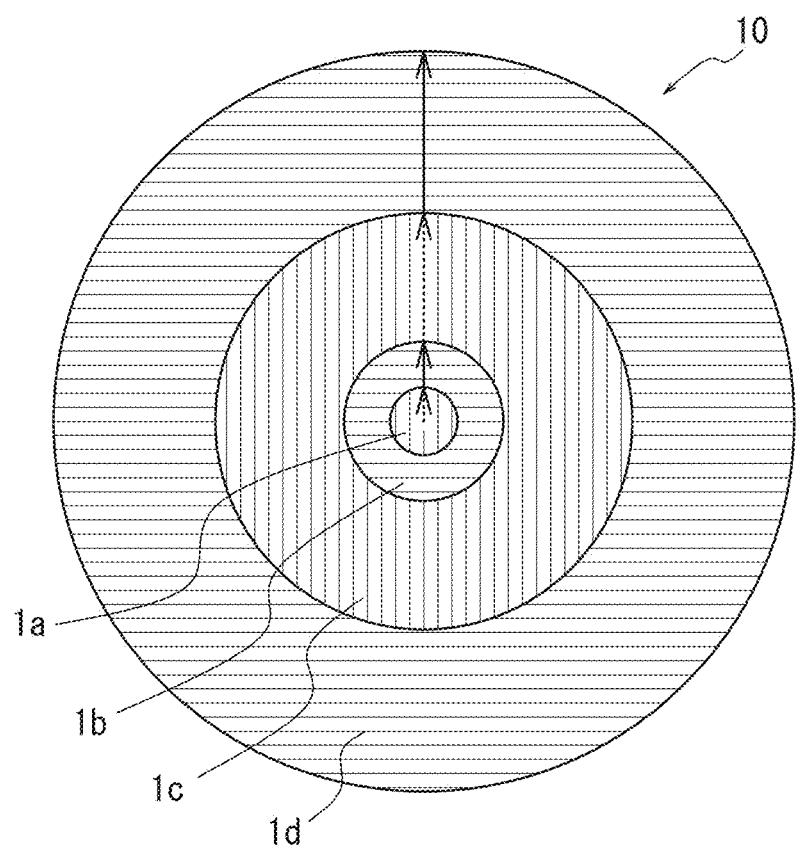
FIG. 8 illustrates a modification to the modulation optical element.

Note that the modulation optical element 10 is not limited to being constituted by joining the two substrates 1a and 1b and may be constituted by joining three or more substrates. FIG. 8 illustrates an example of joining a total of four substrates: one cylindrical substrate 1a and three annular substrates 1b to 1d. In the example in FIG. 8, the substrates are joined so that the phase advancing axis and the phase delaying axis are aligned along a straight line for every other substrate. With this structure as well, erasing light having an inverted electric field vector is collected at the focal point, and therefore the electric field cancels out to yield a beam with a hollow shape.

Figure 9:
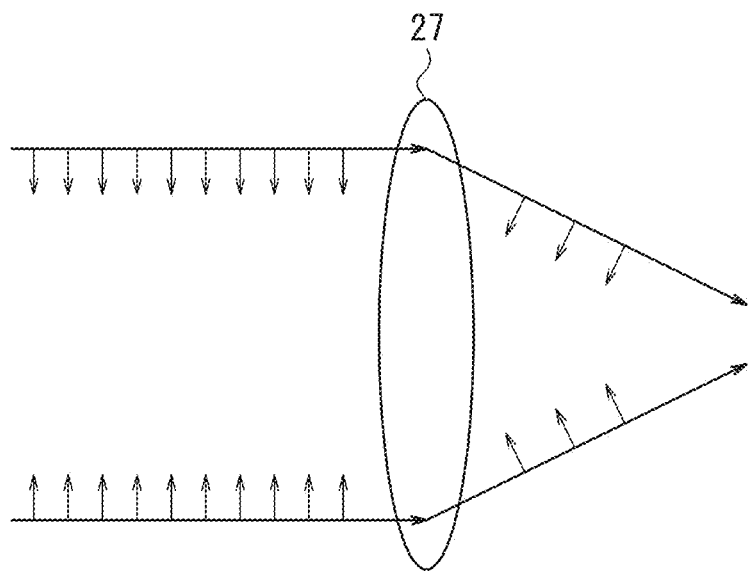
FIG. 9 illustrates the electric field vector of erasing light due to an objective lens.

The super-resolution microscope illustrated in FIG. 7 is assumed to use an objective lens with a relatively small numerical aperture as the objective lens 27. The reason is that if the numerical aperture of the objective lens 27 is large, the collected erasing light loses symmetry. In other words, upon incidence of linearly-polarized erasing light onto the objective lens 27, when the light path of the erasing light is bent in the objective lens 27, the imaging conditions on the focal plane differ between the components respectively perpendicular and parallel to the direction of oscillation of the electric field. The light that is bent in the electric field oscillation plane forms an image that, near the focal point, is tilted with respect to the focal plane. In other words, as illustrated in FIG. 9, the reason is that the electric field vector also has a new component in the optical axis direction (for example, see Y. Iketaki, T. Watanabe, N. Bokor, M. Fujii, Opt. Lett. 32(16), 2357 (2007)).

Figure 10:
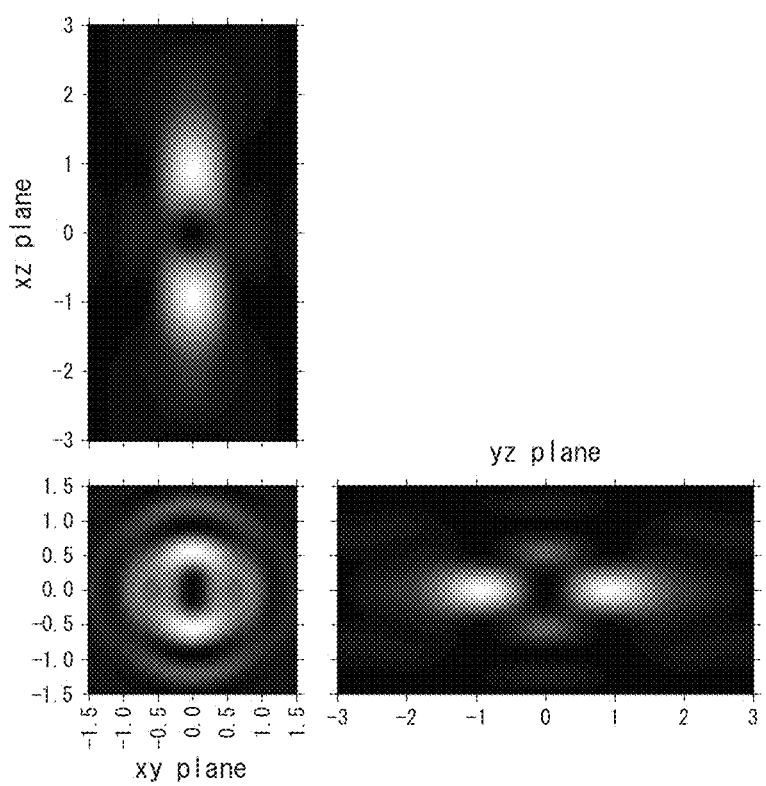
FIG. 10 illustrates the results of simulating the beam shape when collecting linearly-polarized erasing light using an objective lens with a high numerical aperture in the super-resolution microscope in FIG. 7.

For example, upon performing a simulation similar to the one illustrated in FIGS. 6A and 6B on the three-dimensional shape when using an oil immersion objective lens with a numerical aperture of 1.5 as the objective lens 27 and collecting linearly-polarized erasing light, the hollow shape is not a circle with good symmetry, but rather is a nearly rectangular shape, as illustrated in FIG. 10. Note that FIG. 10 illustrates the beam shape in the xy plane perpendicular to the optical axis (z), i.e. the focal plane, as well as in the xz and yz planes.

Figure 11:
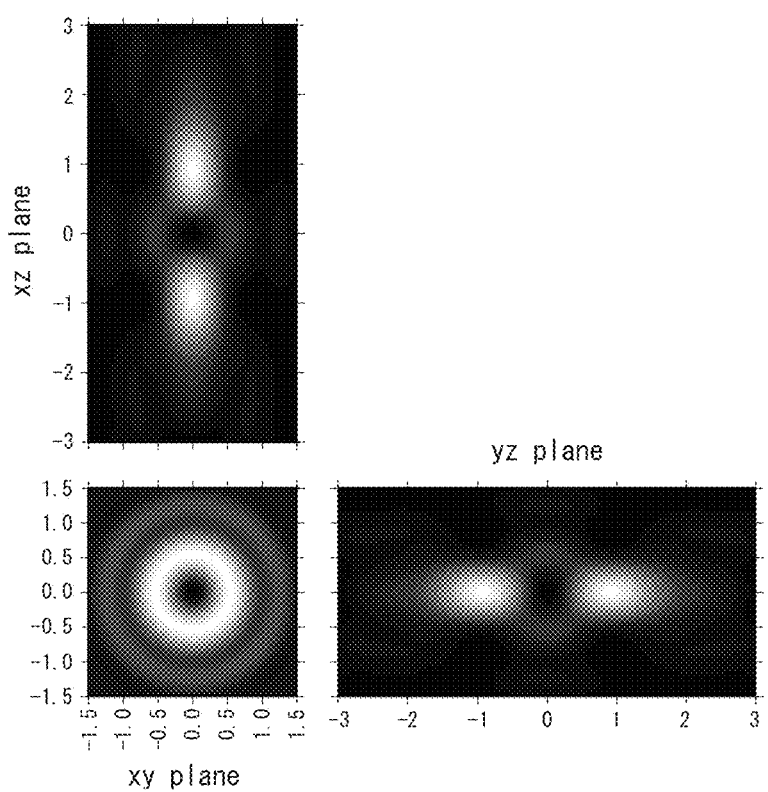
FIG. 11 illustrates the results of simulating the beam shape when collecting circularly-polarized erasing light using an objective lens with a high numerical aperture in the super-resolution microscope in FIG. 7.

Investigation by the inventor revealed that upon performing a similar simulation by causing erasing light to enter an objective lens with the same high numerical aperture as circularly-polarized light, a hollow beam with good symmetry in the xy, xz, and yz planes can be formed, as illustrated in FIG. 11. The beam shape of this erasing light can easily be achieved by inserting a wave plate that functions as a quarter-wave plate with respect to the erasing light along the light path in the illumination optical system.

Figure 12:
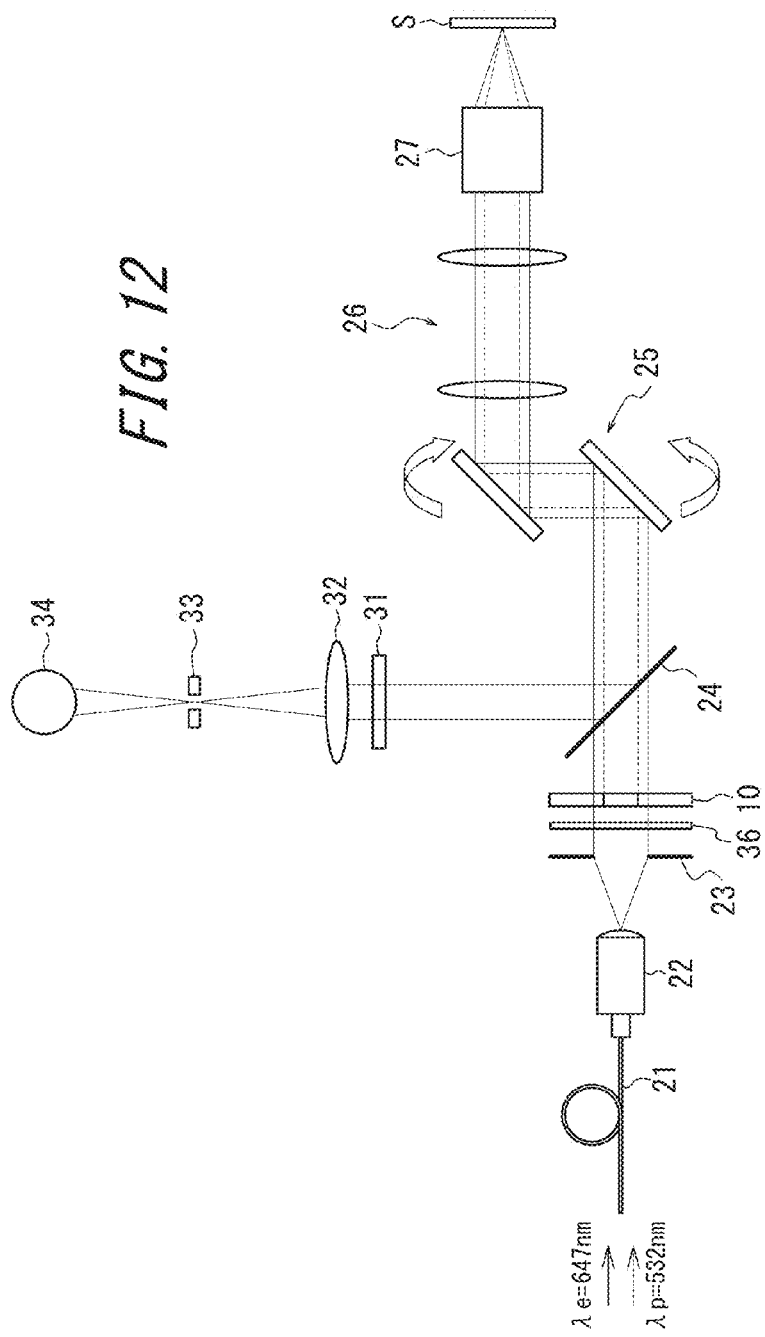
FIG. 12 conceptually illustrates the structure of a super-resolution microscope according to a modification to Embodiment 1.

For example, in the configuration illustrated in FIG. 7, a quarter-wave plate 36 with respect to the erasing light is inserted along the light path between the iris 23 and the modulation optical element 10. i.e. at the incident side of the modulation optical element 10, as illustrated in FIG. 12. By adjusting aperture size of the iris 23, a ratio of the total current intensity between the erase beams passing through the inner and outer substrates can be controlled. Owing to this iris, the electric field can be completely cancelled at the focal point, and thus, the suitable dark hole for super-resolution microscopy can be obtained. The quarter-wave plate 36 is rotationally adjustable around the optical axis of the illumination optical system and optimizes the polarization state of incident erasing light to become as close to circularly-polarized light as possible. In this way, problems that occur when performing phase adjustment with an optical thin film, such as scattered light from the erasing light or error in phase control, can be resolved, thus easily achieving a super-resolution function that is excellent in three dimensions.

Embodiment 2

First, the modulation optical element used in the super-resolution microscope according to Embodiment 2 is described. The modulation optical element used in the present embodiment has a hybrid pattern that includes the pattern of a spiral phase plate and the pattern of an annular phase plate. Specifically, polarization and phase are controlled using an annular joint substrate having different polarization properties. In this way, further optimization of the pumping light and the erasing light is promoted, and while the pumping light is maintained as a Gaussian beam near the light collection point, dichroism that adjusts the beam for only the erasing light is added.

Figure 13:
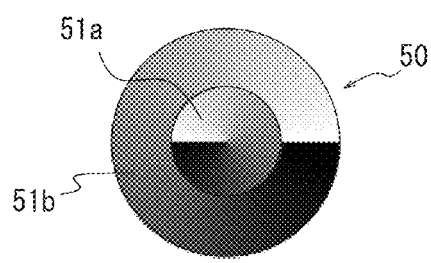
FIG. 13 is a fundamental diagram illustrating the modulation optical element used in Embodiment 2.

FIG. 13 is a fundamental diagram illustrating the modulation optical element used in the present embodiment. This modulation optical element 50 has a double annular structure in which an inner central portion 51a and an outer annular portion 51b are joined in a coplanar manner. The central portion 51a and the annular portion 51b rotate the phase of the erasing light by $2\pi$ in opposite directions around the optical axis and always invert the phase radially by $\pi$. Upon collecting the erasing light transmitted through the modulation optical element 50, since the phase distribution is rotated in opposite directions around the optical axis at the outside and the inside in the beam plane yet the phase rotation is 360°, the erasing light therefore functions as a Laguerre-Gaussian beam, and in both cases the electric field intensity cancels out at the focal point. Radially, however, the phase is always inverted by 180° at the inside and the outside. Hence, the phase distribution is equivalent to when modulating with the annular phase plate illustrated in FIGS. 30A and 30B. Accordingly, collecting a beam having such a phase distribution yields a collected beam having the characteristics of both a Laguerre-Gaussian beam and an annular beam.

Normally, in a super-resolution microscope, use of an objective lens with a large numerical aperture is preferred. The reason is that such an objective lens is used to suppress the intensity of the erasing light and form a fine hollow beam insofar as possible, thus obtaining a high spatial resolution. Upon using linearly-polarized erasing light, however, an electric field vector component in the optical axis direction is generated in the Laguerre-Gaussian beam as illustrated in FIG. 9, and therefore the central intensity at the focal plane does not become zero.

One method for avoiding these circumstances and forming a fine hollow beam for which the central intensity is zero using an objective lens with a high numerical aperture is a method to have circularly-polarized light strike the phase plate. In other words, the circularly-polarized light offsets the electric field vector component in the optical axis direction on the focal plane due to the electric field vector components in perpendicular axis directions for which the phase differs by 90° (for example, see N. Bokor, Opt. Express, 13, 10440-10447 (2005)). In particular, as illustrated in FIG. 13, in the case of the modulation optical element 50 having a double annular structure, the electrical field is efficiently offset further at the focal point upon incidence of circularly-polarized light rotating in opposite directions in the central portion 51a and the annular portion 51b. Therefore, an even tighter three-dimensional dark hole surrounded by the erase light is generated.

Figure 14:
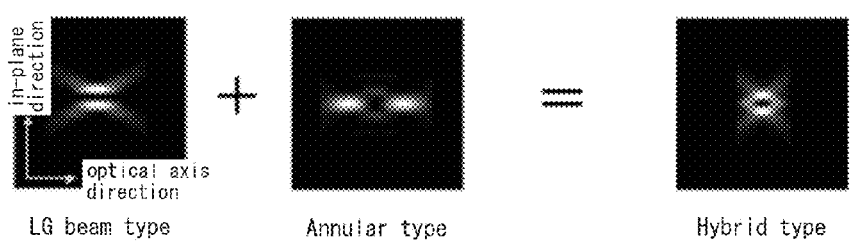
FIG. 14 illustrates the results of simulating the beam shape when using an objective lens with a high numerical aperture to collect circularly-polarized erasing light modulated with the modulation optical element in FIG. 13.

For example, in the modulation optical element 50 illustrated in FIG. 13, it is assumed that the rotation directions of the circularly-polarized erasing light are opposite for the central portion 51a and the annular portion 51b, and that the erasing light transmitted through this modulation optical element 50 is collected using an oil immersion objective lens with a numerical aperture of 1.4. Performing a similar simulation as in FIGS. 6A and 6B and FIG. 10 on the beam shape revealed that a tight dark hole (hybrid type) can be formed in the focal plane and along the optical axis direction to have the shape characteristics of both a Laguerre-Gaussian (LG) beam and an annular beam, as illustrated in FIG. 14.

Figure 15:
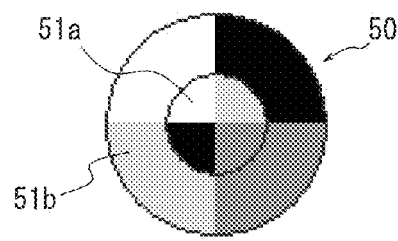
FIG. 15 illustrates an example of a specific structure of the modulation optical element used in Embodiment 2.

In the modulation optical element 50 illustrated in FIG. 13, the phase changes continuously in the central portion 51a and the annular portion 51b. In practice, however, equivalent characteristics can be obtained even with an extremely simple pattern composed of four divided regions in which the phase changes by 90° at a time around the optical axis in the central portion 51a and the annular portion 51b, as illustrated in FIG. 15. FIGS. 16A and 16B illustrate a comparison of the results of simulating the collected beam shape within the focal plane and the optical axis plane using the modulation optical elements 50 in FIG. 13 and in FIG. 15. As is clear from FIGS. 16A and 16B, there is almost no difference in the collected beam shape between the two modulation optical elements 50. For phase modulation by the modulation optical element 50, an optical multilayer film for example is used. For a simple structure, however, composed of four divided regions as illustrated in FIG. 15, the film formation process such as masking is simplified, and therefore such a simple structure also has extremely practical advantages in terms of cost reduction and quality control.

In the modulation optical element 50, dichroism that simultaneously preserves the spatial shape of the pumping light is required. In other words, upon collecting the erasing light transmitted through the modulation optical element 50, a spatial shape such as the one illustrated in FIGS. 16A and 16B is obtained, yet pumping light is collected as a regular Gaussian beam. For phase modulation, for example the optical multilayer film supporting two wavelengths disclosed in Y. Iketaki, and N. Bokor. Opt. Commun. 285, 3798-3804 (2012) may be used. If polarization control is not reliably performed on the pumping light as well, however, super-resolution microscopy cannot be performed. For example, if the substrate thickness of the modulation optical element 50 functions as a half-wave plate for the pumping light, the pumping light that is transmitted through the modulation optical element 50 ends up being collected not as a Gaussian beam but rather as a hollow beam.

Nevertheless, this problem can be solved by providing the substrate of the modulation optical element 50 with dichroic polarization properties. For example, by controlling the thickness of a quartz substrate having a phase advancing axis and a phase delaying axis, the quartz substrate can be caused to function as a quarter-wave plate for the erasing light and as a full-wave plate for the pumping light. The full-wave plate shifts the phase of pumping light transmitted through the substrate by an integer multiple of $2\pi$, and hence the polarization state does not change at all.

Figure 17:
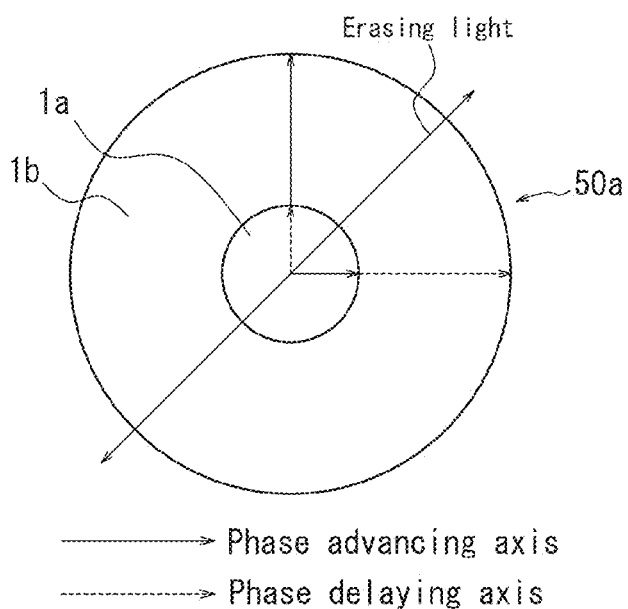
FIG. 17 illustrates the modulation optical element in FIG. 15.
Figure 18:
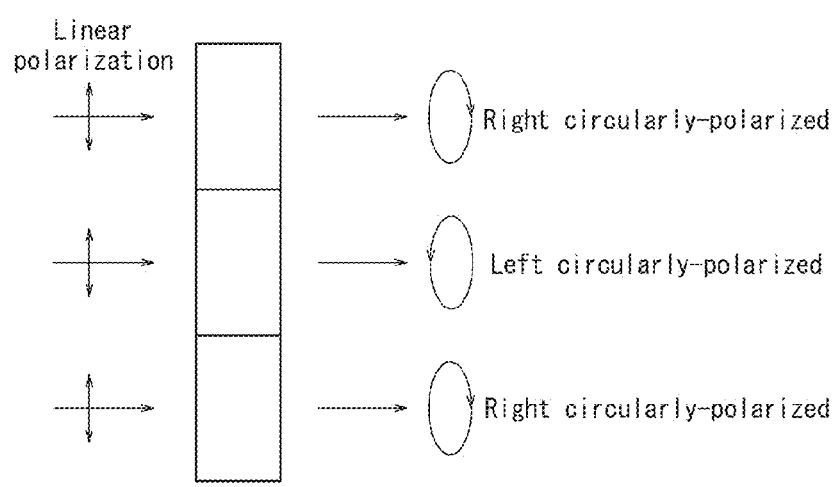
FIG. 18 illustrates the optical properties of the joint substrate in FIG. 17.

The modulation optical element 50 illustrated in FIG. 15 can be produced by including the same manufacturing steps as illustrated in FIG. 2. In other words, in accordance with the manufacturing steps illustrated in FIG. 2, an annular joint substrate 50a having a cylindrical substrate 1a and an annular substrate 1b as illustrated in the plan view in FIG. 17 is first obtained. The thickness of the joint substrate 50a functions as a quarter-wave plate for the erasing light and as a full-wave plate for the pumping light. Accordingly, when linearly-polarized erasing light strikes the joint substrate 50a at an angle of 45° with respect to the phase advancing axis or the phase delaying axis as illustrated in FIG. 17, the erasing light transmitted through the inner cylindrical substrate 1a and the outer annular substrate 1b is converted into circularly-polarized light that rotates in opposite directions, as illustrated in FIG. 18. The pumping light, however, is transmitted as linearly-polarized light without a change in the polarization state.

Subsequently, using a deposition mask, an optical multilayer film is deposited on the cylindrical substrate 1a and annular substrate 1b in FIG. 17. The optical multilayer film has different optical properties, e.g. phase properties, such that the phase of the erasing light changes every 90° around the optical axis in opposite directions for the cylindrical substrate 1a and the annular substrate 1b. The modulation optical element 50 having the central portion 51a and annular portion 51b illustrated in FIG. 15 is thus obtained. When the pumping light and erasing light transmitted through this modulation optical element 50 are collected, the pumping light is collected as a Gaussian beam, whereas the erasing light is collected as a beam having a dark hole. A phase plate that supports two colors and provides a super-resolution function simultaneously in both lateral and longitudinal directions is thus achieved. Accordingly, for example by inserting the modulation optical element 50 in the illumination optical system of a commercial laser scanning type microscope, a three-dimensional super-resolution function can easily be added.

Figure 19:
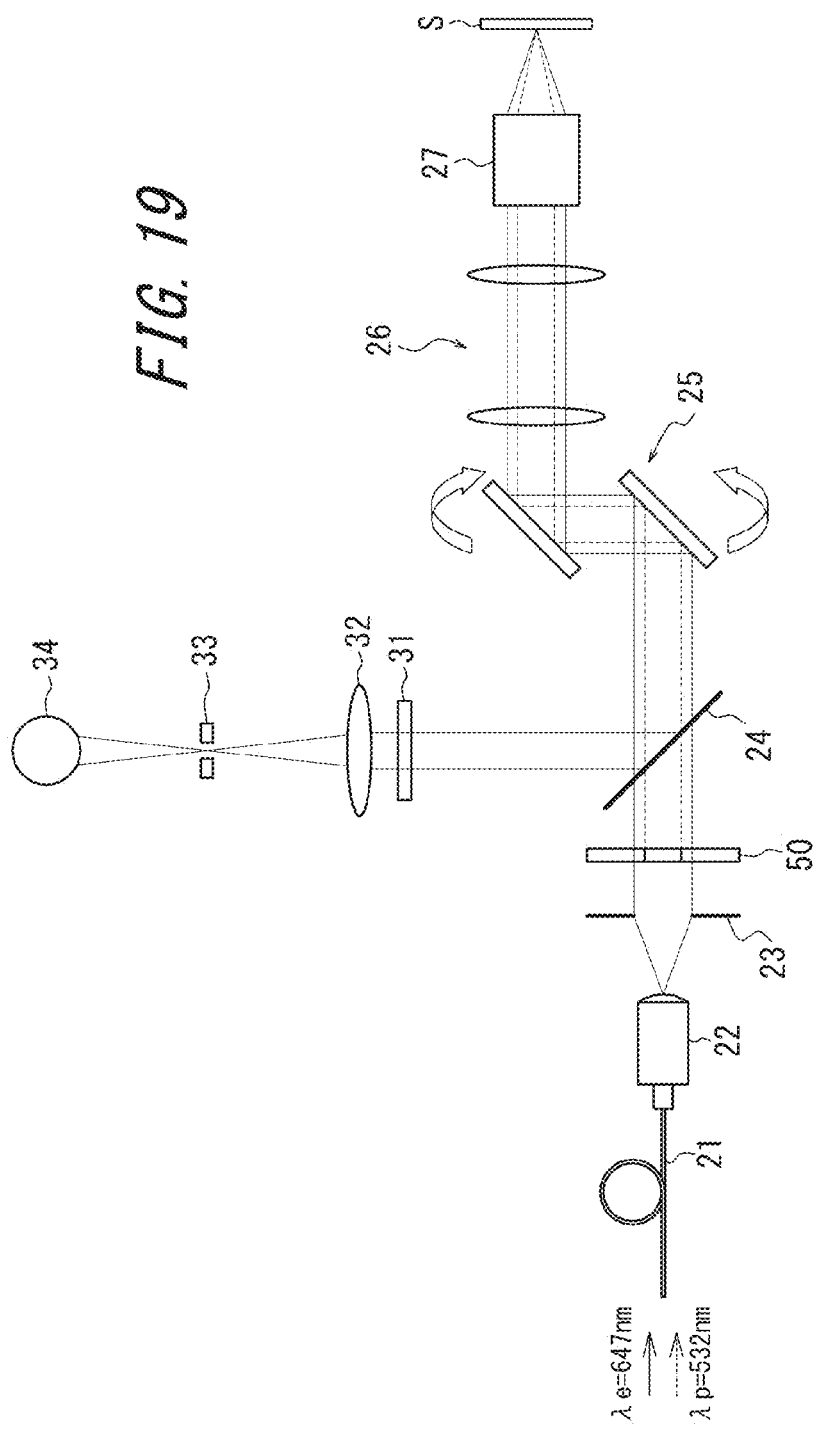
FIG. 19 conceptually illustrates the structure of a super-resolution microscope according to Embodiment 2.

FIG. 19 conceptually illustrates the structure of a super-resolution microscope according to Embodiment 2 of the present invention. This super-resolution microscope has the same basic structure as the super-resolution microscope illustrated in FIG. 7, yet uses the modulation optical element 50 illustrated in FIG. 15 instead of the modulation optical element 10. The remaining structure is similar to FIG. 7. The same structural elements are thus labeled with the same reference signs, and a description thereof is omitted.

Using the super-resolution microscope illustrated in FIG. 19, a sample S can be observed with high three-dimensional spatial resolution. The specifications and structure of the modulation optical element 50 that is used for the super-resolution microscope, however, are determined by the wavelength of the pumping light and of the erasing light. For example, when using a quartz substrate as the substrate of the modulation optical element 50, since the pumping light used in the super-resolution microscope in FIG. 19 has a wavelength ($\lambda_p$) of 532 nm and the erasing light ($\lambda_e$) has a wavelength of 647 nm, a quartz substrate having the above-described refractive index properties in Table 1 is used. The thickness of the quartz substrate is, for example, set to 1492 µm. Linearly-polarized erasing light is thus converted to circularly-polarized light, whereas linearly-polarized pumping light is maintained in its linear polarization state.

Figure 20:
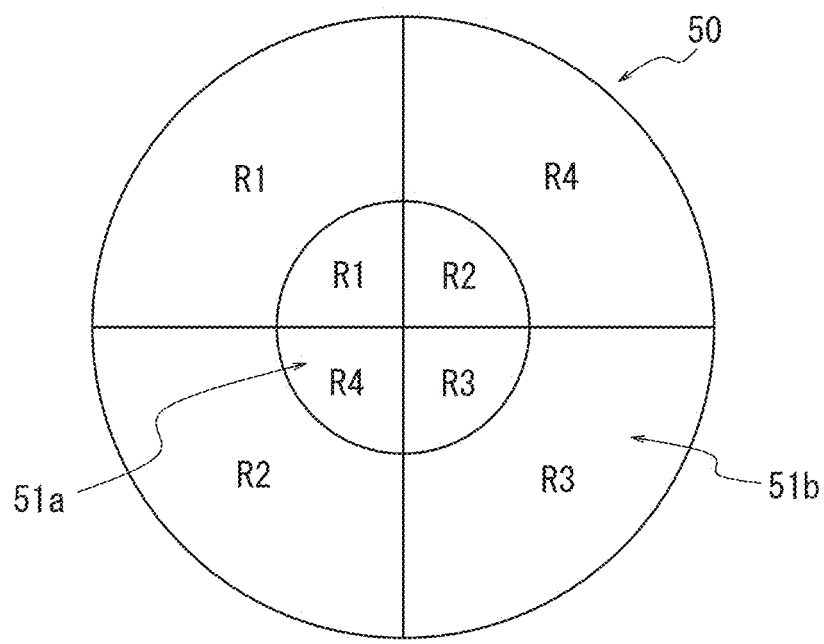
FIG. 20 illustrates the divided regions of the cylindrical portion and the annular portion of the modulation optical element in FIG. 15.

In the central portion 51a and the annular portion 51b in FIG. 15, when the phase modulation of the erasing light is performed with a four-layer optical multilayer film composed of SiO₂ and TiO₂, the thickness of each layer in each of the four divided regions is, for example, as listed in Table 2. Note that in Table 2, R1 to R4 correspond to regions R1 to R4 of the central portion 51a and annular portion 51b illustrated in FIG. 20. Number "1" in the layer column indicates the first layer on the substrate side, and number "4" indicates the fourth layer on the surface side.

TABLE 2

| Layer | Material | Region | | | |
|---|---|---|---|---|---|
| | | R1 (nm) | R2 (nm) | R3 (nm) | R4 (nm) |
| 1 | TiO₂ | 0 | 104 | 170 | 547 |
| 2 | SiO₂ | 0 | 153 | 380 | 611 |
| 3 | TiO₂ | 0 | 107 | 241 | 550 |
| 4 | SiO₂ | 0 | 275 | 487 | 684 |

Using the modulation optical element 50 produced in this way, the erasing light is modulated into a beam having a shape such as the one illustrated in FIG. 14, whereas the pumping light is not subjected to phase modulation and can form an image as a Gaussian beam.

Note that the phase modulation by the modulation optical element 50 is not limited to the above-described four-layered optical multilayer film and may be performed with an optical multilayer film having five or more layers. Furthermore, phase modulation is not limited to an optical multilayer film and may, for example, be performed with a single layer film of SiO₂. In this case. Table 3 lists an example of the thickness of the SiO₂ layer in each of the regions R1 to R4, the phase delay for the erasing light wavelength $\lambda_e$, and the phase delay for the pumping light wavelength $\lambda_p$. In this case as well, the absolute value of the difference between the maximum and the minimum of the phase distribution on the pupil plane of the pumping light transmitted by the modulation optical element 50 is a quarter of a wavelength or less, and therefore the pumping light can form an image as a Gaussian beam. When thus performing phase modulation with a single film of SiO₂, the film manufacturing process is extremely simplified, reducing the cost of the modulation optical element 50.

TABLE 3

| Region | Thickness of SiO₂ layer (μm) | Phase delay at $\lambda_e$ | Phase delay at $\lambda_p$ |
|---|---|---|---|
| R1 | 0 | 0° | 0° = 357.45° + 2.55° |
| R2 | 4.427 | 90° | 354.90° = 357.45° − 2.55° |
| R3 | 3.405 | 180° | 23.77° = 357.45° + 26.32° |
| R4 | 1.022 | 270° | 331.13° = 357.45° − 26.32° |

Figure 21:
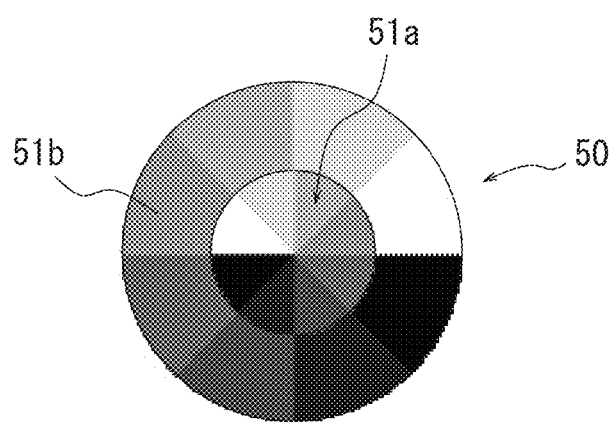
FIG. 21 illustrates a modification to the modulation optical element used in Embodiment 2.
Figure 22:
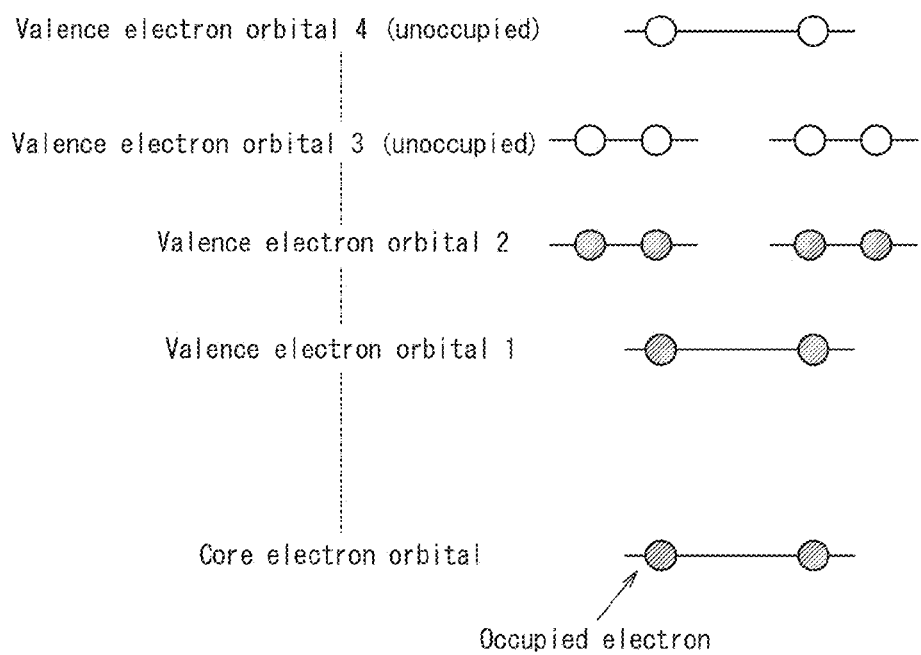
FIG. 22 is a conceptual diagram illustrating an electronic configuration of a valence electron trajectory of a molecule composing a sample.
Figure 23:
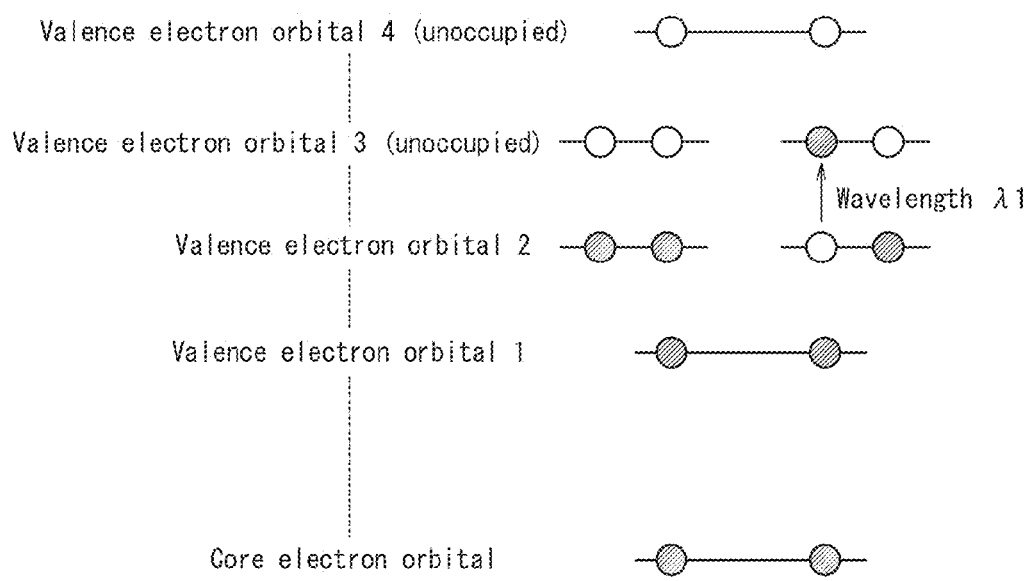
FIG. 23 is a conceptual diagram illustrating a first excited state of the molecule illustrated in FIG. 22.
Figure 24:
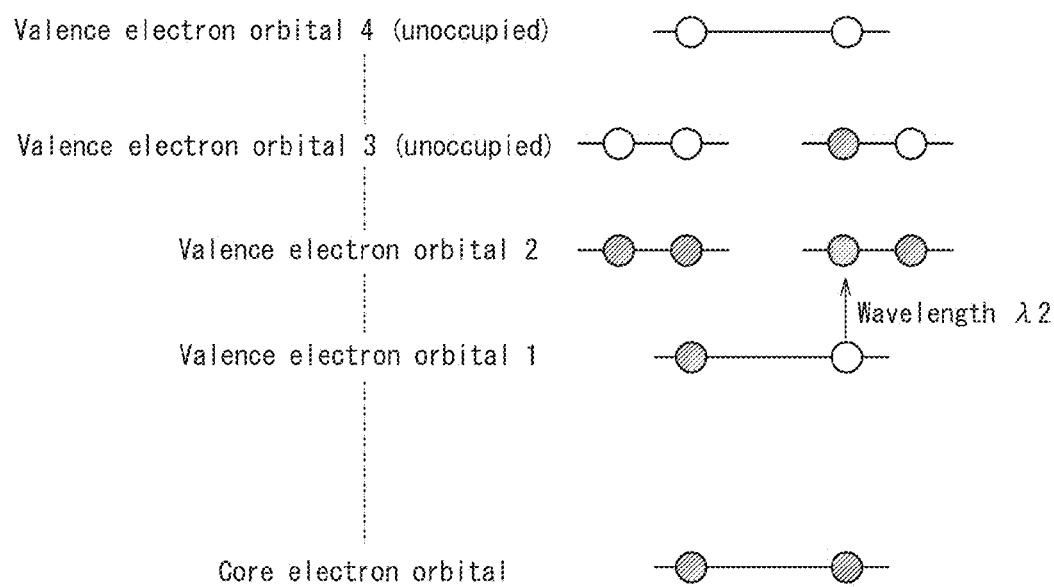
FIG. 24 is a conceptual diagram illustrating a second excited state of the molecule illustrated in FIG. 22.
Figure 25:
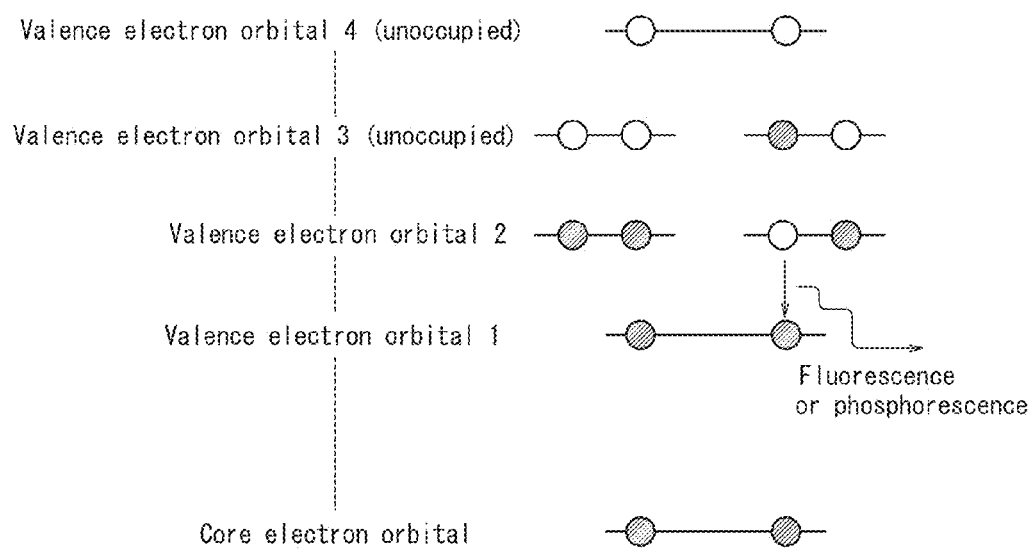
FIG. 25 is a conceptual diagram illustrating the state in which the molecule illustrated in FIG. 22 returns from the second excited state to the ground state.
Figure 26:
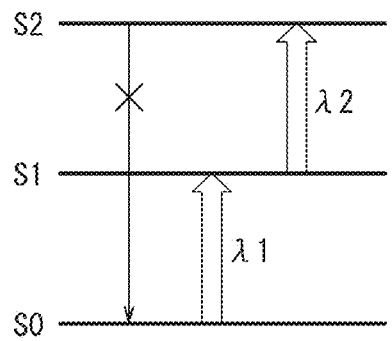
FIG. 26 is a conceptual diagram illustrating a double resonance absorption process of the molecule.
Figure 27:
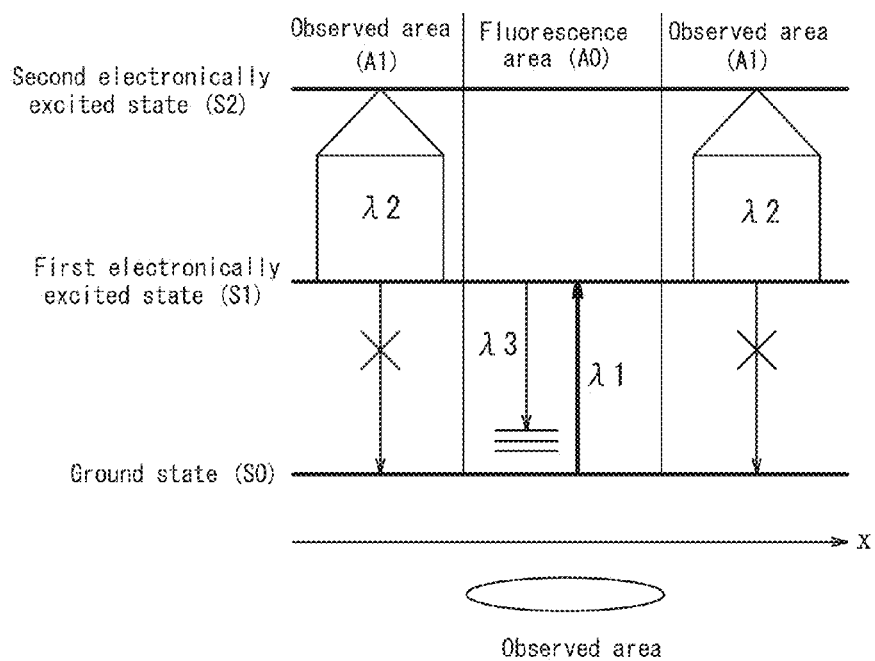
FIG. 27 is a conceptual diagram illustrating a double resonance absorption process of the molecule.
Figure 28:
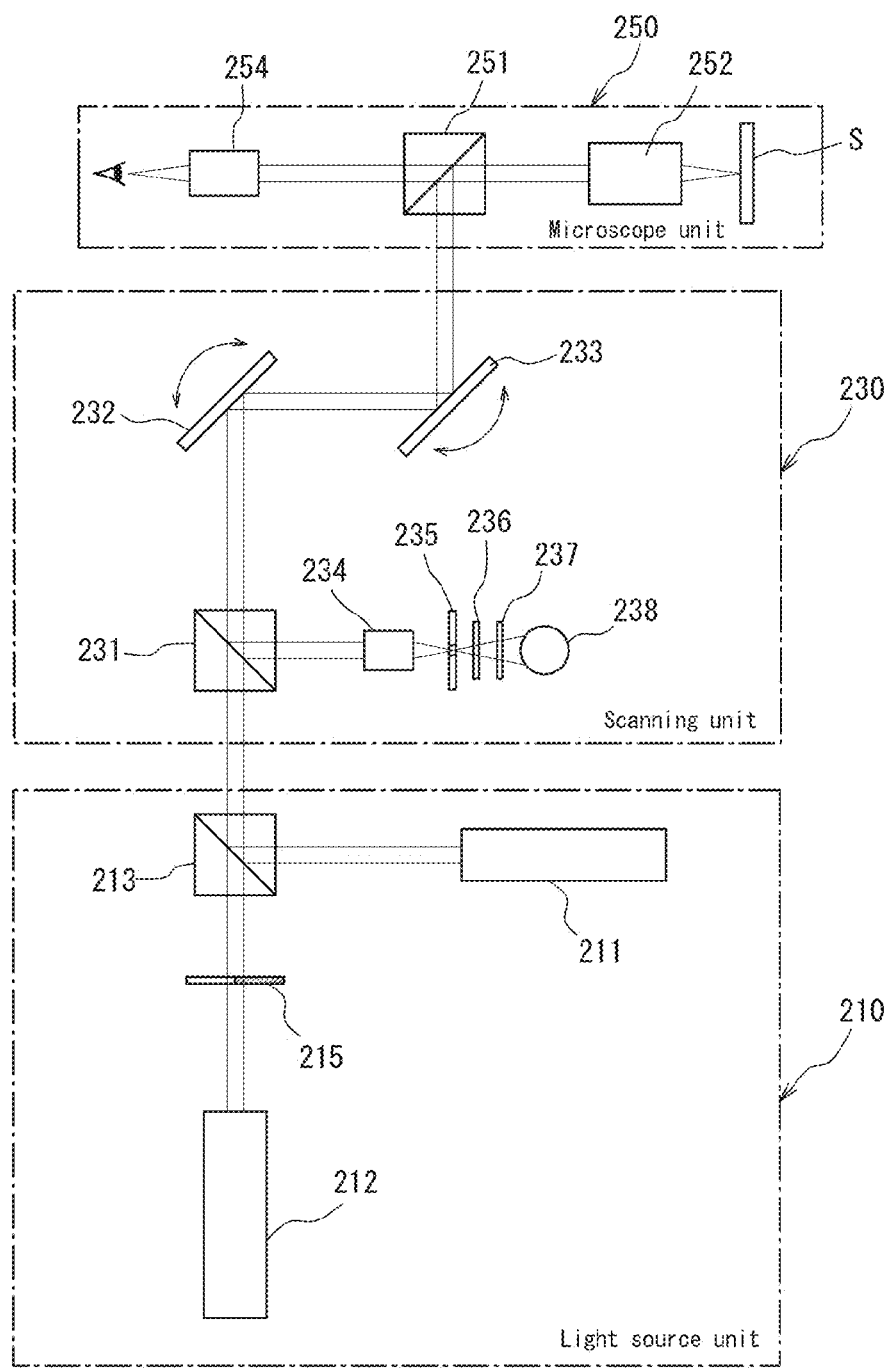
FIG. 28 is a configuration diagram of the main section of a conventional super-resolution microscope.
Figure 29:
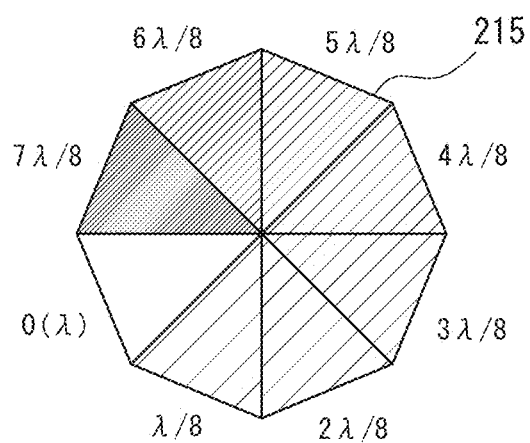
FIG. 29 is an enlarged plan view illustrating the structure of the phase plate in FIG. 28.

The phase modulation regions of the modulation optical element 50 are not limited to four divisions as in FIG. 15 and may be any number of divisions, such as the eight divisions illustrated in FIG. 21. Furthermore, the substrates of the modulation optical element 50 are not limited to two substrates 2a and 2b and may be three or more substrates, like the modulation optical element 10 described in Embodiment 1. For example, as illustrated in FIG. 8, four substrates may be joined so that the phase advancing axis and the to phase delaying axis are aligned along a straight line for every other substrate.

The present invention is not limited to the above embodiments, and a variety of modifications or changes may be made. For example, the optical substrates forming the modulation optical element may be joined in an eccentric state, and each substrate is not limited to a circular shape. Furthermore, for the optical substrates, a well-known birefringent crystal other than quartz may be used, such as YVO₄, TiO₂, LiNbO₃, or the like.

REFERENCE SIGNS LIST

1: Quartz substrate
1a: Cylindrical substrate
1b: Annular substrate
10: Modulation optical element
21: Single mode fiber
22: Collimator lens
23: Iris
24: Bandpass filter
25: Galvano mirror optical system
26: Pupil projection lens
27: Objective lens
31: Block filter
32: Collective lens
33: Pinhole
34: Photodetector
36: Quarter-wave plate
50: Modulation optical element
50a: Joint substrate
51a: Central portion
51b: Annular portion

The invention claimed is:

1. A super-resolution microscope for observing a sample including a molecule having at least two excited quantum states, the super-resolution microscope comprising:
   an illumination optical system configured to collect first illumination light and second illumination light on the sample by partially spatially overlapping the lights to irradiate the sample, the first illumination light being for exciting the molecule from a stable state to a first quantum state and the second illumination light being for causing the molecule to transition further to another quantum state;
   a scanning unit configured to scan the sample by displacing the sample relative to the first illumination light and the second illumination light;
   a detection unit configured to detect a light response signal generated by the sample due to irradiation with the first illumination light and the second illumination light; and
   a modulation optical element disposed in the illumination optical system along a light path traveled by the first illumination light and the second illumination light and configured to spatially modulate the second illumination light, wherein
   in the modulation optical element, a plurality of optical substrates exhibiting anisotropy in a refractive index distribution are joined in a coplanar manner, each optical substrate includes a birefringent medium, and at least two of the optical substrates have a different refractive index with respect to a polarization direction of the second illumination light, and wherein the optical substrates are quartz substrates, and at least two of the quartz substrates are joined so that directions of phase advancing axes thereof intersect.

2. The super-resolution microscope according to claim 1, wherein the first illumination light and the second illumination light are incident on the modulation optical element coaxially.

3. The super-resolution microscope according to claim 1, wherein
the optical substrates are joined concentrically.

4. The super-resolution microscope according to claim 1, wherein
the modulation optical element has a thickness functioning as a half-wave plate for the second illumination light.

5. The super-resolution microscope according to claim 1, wherein
the modulation optical element modulates linearly-polarized second illumination light to be linearly-polarized light such that an oscillation axis of an electric field is in the same direction and an orientation of the electric field is reversed.

6. The super-resolution microscope according to claim 1, wherein
the modulation optical element has a thickness functioning as a full-wave plate for the first illumination light.

7. The super-resolution microscope according to claim 1, wherein
the modulation optical element includes an antireflection film to prevent reflection of the second illumination light.

8. The super-resolution microscope according to claim 1, further comprising
a quarter-wave plate for the second illumination light disposed at an incident side of the modulation optical element.

9. The super-resolution microscope according to claim 8, wherein
the quarter-wave plate is rotationally adjustable around an optical axis of the illumination optical system.

10. A super-resolution microscope for observing a sample including a molecule having at least two excited quantum states, the super-resolution microscope comprising:
an illumination optical system configured to collect first illumination light and second illumination light on the sample by partially spatially overlapping the lights to irradiate the sample, the first illumination light being for exciting the molecule from a stable state to a first quantum state and the second illumination light being for causing the molecule to transition further to another quantum state;
a scanning unit configured to scan the sample by displacing the sample relative to the first illumination light and the second illumination light;
a detection unit configured to detect a light response signal generated by the sample due to irradiation with the first illumination light and the second illumination light; and
a modulation optical element disposed in the illumination optical system along a light path traveled by the first illumination light and the second illumination light and configured to spatially modulate the first illumination light and the second illumination light, wherein
in the modulation optical element, a plurality of optical substrates having different polarization properties with respect to the first illumination light and the second illumination light are joined in a coplanar manner, each optical substrate includes a birefringent medium, and each optical substrate has stacked thereon an optical thin film with different optical properties, and wherein the optical substrates are quartz substrates, and at least two of the quartz substrates are joined so that directions of phase advancing axes thereof intersect.

11. The super-resolution microscope according to claim 10, wherein
the first illumination light and the second illumination light are incident on the modulation optical element coaxially.

12. The super-resolution microscope according to claim 10, wherein
the optical substrates are joined concentrically.

13. The super-resolution microscope according to claim 10, wherein
the modulation optical element has a thickness functioning as a quarter-wave plate for the second illumination light, and
at least two of the quartz substrates are joined so that directions of phase advancing axes thereof are perpendicular.

14. The super-resolution microscope according to claim 13, wherein
the modulation optical element modulates linearly-polarized second illumination light with at least two of the quartz substrates to be circularly-polarized light rotating in opposite directions.

15. The super-resolution microscope according to claim 10, wherein
the modulation optical element has a thickness functioning as a full-wave plate for the first illumination light.

16. The super-resolution microscope according to claim 10, wherein
the optical thin film rotates a phase of the second illumination light around an optical axis by an integer multiple of $2\pi$.

17. The super-resolution microscope according to claim 16, wherein
the optical thin films corresponding to at least two of the optical substrates rotate a phase of the second illumination light in opposite directions.

18. The super-resolution microscope according to claim 10, wherein
the absolute value of a difference between a maximum and a minimum of a phase distribution on a pupil plane of the first illumination light passing through the modulation optical element is a quarter of a wavelength or less.

* * * * *